(12) United States Patent
Zhang et al.

(10) Patent No.: US 11,902,840 B2
(45) Date of Patent: Feb. 13, 2024

(54) TIME DOMAIN RESOURCE CONFIGURATION METHOD AND ACCESS NETWORK DEVICE

(71) Applicant: HUAWEI TECHNOLOGIES CO., LTD., Guangdong (CN)

(72) Inventors: Fang Zhang, Shanghai (CN); Chengyi Wang, Shanghai (CN); Kai Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 414 days.

(21) Appl. No.: 17/197,674

(22) Filed: Mar. 10, 2021

(65) Prior Publication Data

US 2021/0195477 A1 Jun. 24, 2021

Related U.S. Application Data

(63) Continuation of application No. PCT/CN2019/105053, filed on Sep. 10, 2019.

(30) Foreign Application Priority Data

Sep. 10, 2018 (CN) .......................... 201811052784.7
Sep. 27, 2018 (CN) .......................... 201811134766.3

(51) Int. Cl.
*H04L 5/00* (2006.01)
*H04L 5/14* (2006.01)
(Continued)

(52) U.S. Cl.
CPC ....... *H04W 36/0058* (2018.08); *H04L 5/0048* (2013.01); *H04L 5/14* (2013.01);
(Continued)

(58) Field of Classification Search
CPC ............. H04W 36/0058; H04W 24/08; H04W 56/001; H04W 72/0446; H04W 72/542;
(Continued)

(56) References Cited

U.S. PATENT DOCUMENTS 11,075,718 B2 * 7/2021 Zhang ................... H04L 1/1893
2009/0201865 A1 * 8/2009 Uemura ................ H04L 5/0053
370/329
(Continued)

FOREIGN PATENT DOCUMENTS

CN 101784124 A 7/2010
CN 101795473 A 8/2010
(Continued)

OTHER PUBLICATIONS

Fujitsu, "Guard period setting in TDD based NR frame structure," 3GPP TSG RAN WG1 Meeting #87, R1-1611459, Reno, USA, Nov. 14-18, 2016, 9 pages.
(Continued)

*Primary Examiner* — Harry H Kim
(74) *Attorney, Agent, or Firm* — Fish & Richardson P.C.

(57) ABSTRACT

The present disclosure relates to time domain resource configuration methods and access network devices One example method includes determining a guard period (GP) resource required by a terminal device, where the GP resource required by the terminal device is a GP resource required by the terminal device for uplink synchronization with an access network device, and sending first time domain resource configuration information to the terminal device, where the first time domain resource configuration information indicates the GP resource required by the terminal device.

20 Claims, 16 Drawing Sheets

(51) Int. Cl.
*H04W 24/08* (2009.01)
*H04W 56/00* (2009.01)
*H04W 72/0446* (2023.01)
*H04W 72/542* (2023.01)
*H04W 72/23* (2023.01)
*H04W 72/541* (2023.01)
*H04W 36/00* (2009.01)

(52) U.S. Cl.
CPC ......... *H04W 24/08* (2013.01); *H04W 56/001* (2013.01); *H04W 72/0446* (2013.01)

(58) Field of Classification Search
CPC .. H04W 72/23; H04W 72/541; H04L 5/0048; H04L 5/14; H04L 5/0092; H04L 5/1469; H04L 5/0042; H04L 5/0053
See application file for complete search history.

(56) References Cited

U.S. PATENT DOCUMENTS

| | | | |
|---|---|---|---|
| 2013/0136041 | A1 | 5/2013 | Hoymann et al. |
| 2017/0181182 | A1* | 6/2017 | Patel ................. H04L 5/0048 |
| 2018/0102821 | A1 | 4/2018 | Manolakos et al. |
| 2018/0213529 | A1 | 7/2018 | Lee et al. |
| 2018/0255568 | A1 | 9/2018 | Takeda et al. |
| 2019/0246387 | A1* | 8/2019 | Lee ..................... H04J 11/0059 |

FOREIGN PATENT DOCUMENTS

| | | |
|---|---|---|
| CN | 105227282 A | 1/2016 |
| CN | 105246159 A | 1/2016 |
| CN | 106899527 A | 6/2017 |
| CN | 107306450 A | 10/2017 |
| CN | 107734660 A | 2/2018 |
| CN | 107734668 A | 2/2018 |
| CN | 107950051 A | 4/2018 |
| CN | 108141858 A | 6/2018 |
| JP | 2012005143 A | 1/2012 |
| WO | 2017020695 A1 | 2/2017 |
| WO | 2018045516 A1 | 3/2018 |
| WO | 2018054136 A1 | 3/2018 |

OTHER PUBLICATIONS

Office Action in Chinese Appln. No. 201811134766.3, dated Feb. 24, 2023, 8 pages.
Extended European Search Report issued in European Application No. 19861155.0 dated Dec. 2, 2021, 9 pages.
3GPP TS 36.213 V15.2.0 (Jun. 2018), "3rd Generation Partnership Project; Technical Specification Group Radio Access Network; Evolved Universal Terrestrial Radio Access (E-UTRA); Physical layer procedures(Release 15),"Jun. 2018, 541 pages.
PCT International Search Report and Written Opinion issued in International Application No. PCT/CN2019/105053 dated Nov. 6, 2019, 15 pages (with English translation).
Etri, "Discussion on the slot structure in time domain," 3GPP TSG RAN WG1 Meeting #86bis, R1-1609393, Lisbon, Portugal, Oct. 10-14, 2016, 4 pages.
Fraunhofer IIS, "Time and Frequency Domain Resource Allocation with K Repetitions," 3GPP TSG-RAN WG1 Meeting #91, R1-1720991, Reno, USA, Nov. 27-Dec. 1, 2017, 7 pages.

* cited by examiner

| Slot Slot 0 | Slot Slot 1 | Slot Slot 2 | Slot Slot 3 | Slot Slot 4 | Slot Slot 5 | Slot Slot 6 | Slot Slot 7 | Slot Slot 8 | Slot Slot 9 |
|---|---|---|---|---|---|---|---|---|---|
| Downlink DL | Downlink DL | Downlink DL | Downlink DL | Downlink DL | Downlink DL | Downlink DL | | Uplink UL | Uplink UL |

FIG. 3B

Front portion of a U
slot is interfered with

Rear portion of a U
slot is interfered with

TIME DOMAIN RESOURCE CONFIGURATION METHOD AND ACCESS NETWORK DEVICE

CROSS-REFERENCE TO RELATED APPLICATIONS

This application is a continuation of International Application No. PCT/CN2019/105053, filed on Sep. 10, 2019, which claims priority to Chinese Patent Application No. 201811134766.3, filed on Sep. 27, 2018 and Chinese Patent Application No. 201811052784.7, filed on Sep. 10, 2018. The disclosures of the aforementioned applications are hereby incorporated by reference in their entireties.

TECHNICAL FIELD

This application relates to the communications field, and in particular, to a time domain resource configuration method and an access network device.

BACKGROUND

In a time division duplex (time division duplex, TDD) system, a guard period (GP, guard period) is a guard interval configured for uplink-downlink handover. If an uplink transmission system is receiving a signal while a downlink transmission system of a base station is sending a signal, because a same frequency is used for uplink and downlink transmission in TDD, the uplink transmission system is severely interfered with. In addition, in the case of changing from transmitting to receiving, power of a transmitter cannot immediately disappear. Instead, there is a decline process in which the transmitter cannot work. Likewise, in the case of changing from receiving to transmitting, the transmitter also needs time to increase power, and the transmitter also cannot work during this time.

A length of the GP can be configured. If the length of the GP is appropriately configured, the GP can effectively help avoid interference between uplink and downlink signals. Configuration of the GP is related to a radius of a cell. In other words, the configuration of the GP is related to coverage of the cell. In a long term evolution (long term evolution, LTE) system, lengths of GPs are defined for different special subframe configurations in the TS36.213 protocol. Theoretical maximum coverage of a corresponding cell is 5 km to 100 km. As shown in Table 1 below, different configuration of the GPs may be selected based on actual application scenarios.

TABLE 1

| Special subframe con-figuration | Normal cyclic prefix (cyclic prefix, CP) | | | Round-trip delay | Theoretical maximum coverage |
|---|---|---|---|---|---|
| | DwPTS (Ts) | GP (Ts) | UpPTS (Ts) | RTDmax (μs) | distance (km) |
| 0 | 6592 | 21936 | 2192 | 677.06 | 101.56 |
| 1 | 19760 | 8768 | | 248.42 | 37.26 |
| 2 | 21952 | 6576 | | 177.06 | 26.56 |
| 3 | 24144 | 4384 | | 105.71 | 15.86 |
| 4 | 26336 | 2192 | | 34.35 | 5.15 |
| 5 | 6592 | 19744 | 4384 | 605.71 | 90.86 |
| 6 | 19760 | 6576 | | 177.06 | 26.56 |
| 7 | 21952 | 4384 | | 105.71 | 15.86 |
| 8 | 24144 | 2192 | | 34.35 | 5.15 |

It may be understood that the DwPTS is a downlink pilot slot, and an English full name is downlink pilot time slot, RTDmax=GP*(1/30.72 μs)−17−20, and a theoretical maximum coverage distance=3*10e8*RTDmax/2.

The configuration of the GP in the LTE system is cell-level static configuration. For example, a special subframe configuration of 7 is selected for more than 95% of base stations in a live network. To avoid an interference problem caused by an atmospheric duct, a special subframe configuration of 5 is selected for a small quantity of base stations. The configuration of the GP is applicable to all terminal devices and generally does not change.

In a new radio (new radio, NR) system, flexible configuration of a time domain resource is supported in a protocol. However, how to configure an appropriate GP resource for a terminal becomes a problem that needs to be urgently resolved.

SUMMARY

Embodiments of this application provide a time domain resource configuration method and an access network device, to implement UE-level semi-static or dynamic configuration of a GP and flexible and dynamic uplink-downlink resource allocation, thereby implementing effective utilization of resources.

In view of this, a first aspect of the embodiments of this application provides a time domain resource configuration method. The method may be used for an access network device or a chip in the access network device, and may include: determining, by the access network device, a guard period GP resource required by a terminal device, where the GP resource required by the terminal device is a GP resource required by the terminal device for uplink synchronization with the access network device; and sending first time domain resource configuration information to the terminal device, where the first time domain resource configuration information indicates the GP resource required by the terminal device. It may be understood that the guard period GP resource required by the terminal device is a minimum GP resource required when uplink transmission of the terminal device is not interfered with by downlink transmission of the terminal device, and the guard period GP resource required by the terminal device can also ensure that the terminal device is uplink-synchronized with another terminal device in a same cell.

In this embodiment of this application, the access network device may configure the first time domain resource configuration information for the terminal device based on the GP resource required by the terminal device, and the first time domain resource configuration information may be used to indicate the GP resource required by the terminal device. That is, the access network device may flexibly send the first time domain resource configuration information to the terminal device based on the GP resource required by the terminal device, thereby improving utilization of resources.

Optionally, in some embodiments of this application, the determining a GP resource required by a terminal device may include: determining an uplink timing advance TA measurement value of the terminal device; determining a GP length based on the uplink TA measurement value of the terminal device; and determining the GP resource based on the GP length. The TA measurement value indicates a minimum one-way delay required for a signal to be transmitted from the terminal device to the access network device. A round trip delay of the signal from the target terminal device to the access network device is twice the TA measurement value. With other factors such as a handover time required for the uplink-downlink handover of the terminal device taken into account, a minimum time required for ensuring a round trip of the signal of the target terminal device may be obtained, and a minimum quantity of GP symbols required by the target terminal device can be obtained by dividing the minimum time by a symbol length. In this embodiment of this application, a specific implementation in which the access network device determines the GP resource required by the terminal device is provided, so that logic of a technology of this application is clearer and the solution is more complete.

Optionally, in some embodiments of this application, the method may further include: determining a GP resource required by a cell in which the terminal device is located, where the GP resource required by the cell is a GP resource required by a remote terminal device for uplink synchronization with the access network device; and the first time domain resource configuration information indicates the GP resource required by the cell, and the GP resource required by the cell includes the GP resource required by the terminal device. It may be understood that the access network device determines the GP resource required by the cell in which the terminal device is located, and then the first time domain resource configuration information may indicate the GP resource required by the cell. Another option for sending the first time domain resource configuration information to the terminal device is added.

Optionally, in some embodiments of this application, the determining a GP resource required by a cell in which the terminal device is located may include but is not limited to the following implementations: determining a first GP length based on a maximum coverage distance of the cell; and determining, based on the first GP length, the GP resource required by the cell in which the terminal device is located; or determining a second GP length based on uplink-downlink subframe configuration of the cell; and determining, based on the second GP length, the GP resource required by the cell in which the terminal device is located; or determining a first GP length based on a maximum coverage distance of the cell; determining a second GP length based on uplink-downlink subframe configuration of the cell; and determining, based on a larger one of the first GP length and the second GP length, the GP resource required by the cell in which the terminal device is located. In this embodiment of this application, several specific implementations in which the access network device determines the GP resource required by the cell in which the terminal device is located are provided, thereby increasing feasibility of the solution.

Optionally, in some embodiments of this application, the method may further include: sending second time domain resource configuration information to the terminal device, where the second time domain resource configuration information is used to indicate that an available time domain resource is a downlink time domain resource; and the available time domain resource is some or all resources other than the GP resource required by the terminal device in the GP resource required by the cell in which the terminal device is located. In this embodiment of this application, the access network device may also send the second time domain resource configuration information to the terminal device in addition to the first time domain resource configuration information. The second time domain resource configuration information may be used to indicate that the available time domain resource is a downlink time domain resource. In other words, more downlink time domain resources can be scheduled by the terminal device, thereby improving communication efficiency and increasing availability of resources.

Optionally, in some embodiments of this application, the method may further include: sending second time domain resource configuration information to the terminal device, where the second time domain resource configuration information is used to indicate that an available time domain resource is an uplink time domain resource; and the available time domain resource is some or all resources other than the GP resource required by the terminal device in the GP resource required by the cell in which the terminal device is located. In this embodiment of this application, the access network device may also send the second time domain resource configuration information to the terminal device in addition to the first time domain resource configuration information. The second time domain resource configuration information may be used to indicate that the available time domain resource is an uplink time domain resource. In other words, more uplink time domain resources can be scheduled by the terminal device, thereby improving communication efficiency and increasing availability of resources.

Optionally, in some embodiments of this application, before the sending second time domain resource configuration information to the terminal device, the method may further include: sending indication information to the terminal device, where the indication information is used to indicate the terminal device to send an uplink signal on the available time domain resource; and performing interference measurement on the available time domain resource, where the sending second time domain resource configuration information to the terminal device includes: when the available time domain resource is not interfered with or an interference measurement value is less than a threshold, sending the second time domain resource configuration information to the terminal device. In this embodiment of this application, before sending the second time domain resource configuration information to the terminal device, the access network device needs to perform interference measurement on the available time domain resource. If the available time domain resource is not interfered with or the interference measurement value is less than the threshold, the access network device sends the second time domain resource configuration information to the terminal device. In this way, availability of the time domain resource indicated by the second time domain resource configuration information sent by the access network device to the terminal device is higher.

Optionally, in some embodiments of this application, after the sending second time domain resource configuration information to the terminal device, the method further includes: sending indication information to the terminal device, where the indication information is used to indicate the terminal device to send an uplink signal on the uplink time domain resource; performing interference measurement on the uplink time domain resource by using the uplink signal; and when an interference measurement value of the uplink time domain resource is greater than a threshold, skipping performing uplink scheduling on the uplink time domain resource. In this embodiment of this application, when the interference measurement value of the uplink time domain resource is greater than the threshold, the access network device skips performing uplink scheduling on the uplink time domain resource. That is, the access network device does not allocate an uplink resource on the uplink time domain resource.

Optionally, in some embodiments of this application, the method may further include: determining a GP resource required by a cell, where the GP resource required by the cell is a GP resource required by a remote terminal device for uplink synchronization with the access network device. The GP resource required by the cell is the GP resource required by the cell in which the terminal device is located.

Optionally, in some embodiments of this application, the method may further include: sending indication information to the terminal device, where the indication information is used to indicate the terminal device to send an uplink signal on the available time domain resource; and performing uplink interference measurement on the available time domain resource by using the uplink signal, where the available time domain resource is some or all resources other than the GP resource required by the terminal device in the GP resource required by the cell in which the terminal device is located; and when the available time domain resource is interfered with or an interference measurement value is greater than a threshold, the first time domain resource configuration information is further used to indicate that the available time domain resource is the GP resource. In this embodiment of this application, when the available time domain resource is interfered with or the interference measurement value is less than the threshold, the first time domain resource configuration information is further used to indicate that the available time domain resource is the GP resource, that is, a flexible resource.

Optionally, in some embodiments of this application, the method may further include: sending third time domain resource configuration information to the terminal device, where the third time domain resource configuration information is used to indicate that an available time domain resource is an uplink time domain resource or a downlink time domain resource; and the available time domain resource is some or all resources other than the GP resource required by the terminal device in the GP resource required by the cell in which the terminal device is located. In this embodiment of this application, the available time domain resource may be configured as the uplink time domain resource or the downlink time domain resource. This can be flexibly adjusted based on an actual requirement.

Optionally, in some embodiments of this application, when the third time domain resource configuration information is used to indicate that the available time domain resource is an uplink time domain resource, the method may further include: sending indication information to the terminal device, where the indication information is used to indicate the terminal device to send an uplink signal on the uplink time domain resource; performing interference measurement on the uplink time domain resource by using the uplink signal; and when the uplink time domain resource is interfered with or an interference measurement value is greater than a threshold, skipping performing uplink scheduling on the uplink time domain resource. In this embodiment of this application, when the interference measurement value of the uplink time domain resource is greater than the threshold, the access network device skips performing uplink scheduling on the uplink time domain resource. That is, the access network device does not allocate an uplink resource on the uplink time domain resource.

A second aspect of the embodiments of this application provides an access network device. The access network device has a function of implementing UE-level semi-static or dynamic configuration of a GP and flexible and dynamic uplink-downlink resource allocation to effectively utilize resources. The function may be implemented by hardware, or may be implemented by corresponding software executed by hardware. The hardware or software includes one or more modules corresponding to the foregoing function.

The access network device may include:
a processing module, configured to determine a guard period GP resource required by a terminal device, where the GP resource required by the terminal device is a GP resource required by the terminal device for uplink synchronization with the access network device; and
a transceiver module, configured to send first time domain resource configuration information to the terminal device, where the first time domain resource configuration information indicates the GP resource required by the terminal device.

Optionally, in some embodiments of this application, the processing module is specifically configured to: determine an uplink timing advance TA measurement value of the terminal device; determine a GP length based on the uplink TA measurement value of the terminal device; and determine the GP resource based on the GP length.

Optionally, in some embodiments of this application, the processing module is further configured to determine a GP resource required by a cell in which the terminal device is located, where the GP resource required by the cell is a GP resource required by a remote terminal device for uplink synchronization with the access network device; and the first time domain resource configuration information indicates the GP resource required by the cell, and the GP resource required by the cell includes the GP resource required by the terminal device.

Optionally, in some embodiments of this application, the processing module is specifically configured to: determine a first GP length based on a maximum coverage distance of the cell; and determine, based on the first GP length, the GP resource required by the cell in which the terminal device is located; or
the processing module is specifically configured to: determine a second GP length based on uplink-downlink subframe configuration of the cell; and determine, based on the second GP length, the GP resource required by the cell in which the terminal device is located; or
the processing module is specifically configured to: determine a first GP length based on a maximum coverage distance of the cell; determine a second GP length based on uplink-downlink subframe configuration of the cell, and determine, based on a larger one of the first GP length and the second GP length, the GP resource required by the cell in which the terminal device is located.

Optionally, in some embodiments of this application, the transceiver module is further configured to: send second time domain resource configuration information to the terminal device, where the second time domain resource configuration information is used to indicate that an available time domain resource is a downlink time domain resource; and the available time domain resource is some or all resources other than the GP resource required by the terminal device in the GP resource required by the cell in which the terminal device is located.

Optionally, in some embodiments of this application, the transceiver module is further configured to: send second time domain resource configuration information to the terminal device, where the second time domain resource configuration information is used to indicate that an available time domain resource is an uplink time domain resource; and the available time domain resource is some or all resources other than the GP resource required by the terminal device in the GP resource required by the cell in which the terminal device is located.

Optionally, in some embodiments of this application, the transceiver module is further configured to send indication information to the terminal device, where the indication information is used to indicate the terminal device to send an uplink signal on the available time domain resource; and the processing module is further configured to perform interference measurement on the uplink time domain resource by using the uplink signal; and the transceiver module is specifically configured to: when the available time domain resource is not interfered with or an interference measurement value is less than a threshold, send the second time domain resource configuration information to the terminal device.

Optionally, in some embodiments of this application, the transceiver module is further configured to send indication information to the terminal device, where the indication information is used to indicate the terminal device to send an uplink signal on the uplink time domain resource; and the processing module is further configured to: perform interference measurement on the uplink time domain resource by using the uplink signal; and when an interference measurement value of the uplink time domain resource is greater than a threshold, skip performing uplink scheduling on the uplink time domain resource.

Optionally, in some embodiments of this application, the processing module is further configured to determine a GP resource required by a cell, where the GP resource required by the cell is a GP resource required by a remote terminal device for uplink synchronization with the access network device.

Optionally, in some embodiments of this application, the transceiver module is further configured to send indication information to the terminal device, where the indication information is used to indicate the terminal device to send an uplink signal on the available time domain resource; and the processing module is further configured to: perform uplink interference measurement on the available time domain resource by using the uplink signal, where the available time domain resource is some or all resources other than the GP resource required by the terminal device in the GP resource required by the cell in which the terminal device is located; and when the available time domain resource is interfered with or an interference measurement value is greater than a threshold, the first time domain resource configuration information is further used to indicate that the available time domain resource is the GP resource.

Optionally, in some embodiments of this application, the transceiver module is further configured to: send third time domain resource configuration information to the terminal device, where the third time domain resource configuration information is used to indicate that an available time domain resource is an uplink time domain resource or a downlink time domain resource, and the available time domain resource is some or all resources other than the GP resource required by the terminal device in the GP resource required by the cell in which the terminal device is located.

Optionally, in some embodiments of this application, when the third time domain resource configuration information is used to indicate that an available time domain resource is an uplink time domain resource, the transceiver module is further configured to send indication information to the terminal device, where the indication information is used to indicate the terminal device to send an uplink signal on the uplink time domain resource; and the processing module is further configured to: perform interference measurement on the uplink time domain resource by using the uplink signal; and when the uplink time domain resource is interfered with and an interference measurement value is greater than a threshold, skip performing uplink scheduling on the uplink time domain resource.

A third aspect of the embodiments of this application provides an access network device, and the access network device may include:

a processor, and optionally, the access network device may further include a memory and a transceiver, where the memory, the transceiver, and the processor are connected by using a bus;

the memory is configured to store operation instructions;

optionally, the processor of the access network device may implement each step of the foregoing method according to the first aspect by invoking a program in the memory; and optionally, the transceiver may complete each remaining step of the foregoing method according to the first aspect that can be implemented by the processor of the access network device by using the transceiver.

For example, the processor is configured to determine a guard period GP resource required by a terminal device, where the GP resource required by the terminal device is a GP resource required by the terminal device for uplink synchronization with the access network device.

For example, the transceiver is configured to send first time domain resource configuration information to the terminal device, where the first time domain resource configuration information indicates the GP resource required by the terminal device.

A fourth aspect of the embodiments of this application provides a wireless communications apparatus, and the wireless communications apparatus may include:

at least one processor, a memory, a transceiver circuit, and a bus system, where the processor, the memory, and the transceiver circuit are coupled through the bus system, the wireless communications apparatus communicates with a terminal device through the transceiver circuit, the memory is configured to store program instructions, and the at least one processor is configured to execute the program instructions stored in the memory, so that the wireless communications apparatus performs any operation of the access network device in the method according to the first aspect of the embodiments of this application. The wireless communications apparatus may be an access network device or a system chip that is used for the access network device to perform a corresponding function.

A fifth aspect of the embodiments of this application provides a computer-readable storage medium. It should be noted that the technical solutions of the present invention essentially, or the part contributing to the prior art, or all or some of the technical solutions may be implemented in a form of a software product. The computer software product is stored in a storage medium for storing computer software instructions used by the foregoing access network device, and the computer software instructions include a program designed for the access network device in any one of the first aspect and optional manners of the first aspect.

The storage medium includes: any medium that can store program code, such as a USB flash drive, a removable hard disk, a read-only memory (ROM, read-only memory), a random access memory (RAM, random access memory), a magnetic disk, or an optical disc.

A sixth aspect of the embodiments of this application provides a computer program product. The computer program product includes instructions. When the instructions are run on a computer, the computer is enabled to perform the method according to any one of the first aspect or the optional implementations of the first aspect of this application.

BRIEF DESCRIPTION OF DRAWINGS

To describe the technical solutions in the embodiments of this application more clearly, the following briefly describes the accompanying drawings for describing the prior art or the embodiments. Apparently, the accompanying drawings in the following description show merely some embodiments of this application, and other drawings may still be derived from these accompanying drawings.

FIG. 3B is another example diagram of cell-level semi-static configuration information according to an embodiment of this application;

FIG. 5A-1 and FIG. 5A-2 are other schematic diagrams of a time domain resource configuration method according to an embodiment of this application;

DESCRIPTION OF EMBODIMENTS

To make a person skilled in the art understand the solutions in this application better, the following describes the technical solutions in the embodiments of this application with reference to the accompanying drawings in the embodiments of this application. Apparently, the described embodiments are merely a part rather than all of the embodiments of this application. Embodiments based on the embodiments of this application shall fall within the protection scope of this application.

Figure 1:
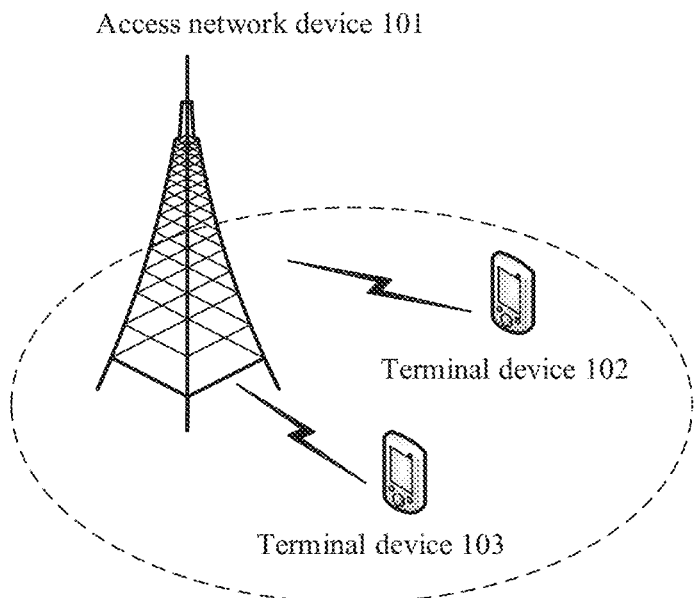
FIG. 1 is a diagram of a system architecture to which an embodiment of this application is applied.

A communications system provided in the embodiments of this application includes an access network device and at least one terminal device. The access network device can communicate with the at least one terminal device. For example, as shown in FIG. 1, the access network device includes an access network device 101, the at least one terminal device includes a terminal device 102 and a terminal device 103, the terminal device 102 communicates with the access network device 101, and the terminal device 103 communicates with the access network device 101. It should be noted that the access network device and the terminal device included in the communications system shown in FIG. 1 are only an example. In the embodiments of this application, a type and a quantity of network elements included in the communications system and a connection relationship between the network elements are not limited thereto.

The access network device may be a device that is on an access network side and that is configured to support a terminal in accessing the communications system. For example, the access network device may be an evolved NodeB (evolutional node B, eNB or e-NodeB for short), a macro base station, a micro base station (also referred to as a "small cell"), a pico base station, an access point (access point, AP), a transmission point (transmission point, TP), or a next-generation NodeB (new generation Node B, gNodeB) in an LTE system, a next-generation (mobile communication) (new radio, NR) system, or an authorized auxiliary access long-term evolution LTE (authorized auxiliary access long-term evolution, LAA-LTE) system.

The terminal device is a device that provides voice or data connectivity to a user. For example, the terminal device may be referred to as user equipment (user equipment, UE), a mobile station (mobile station, MS), or a mobile terminal (mobile terminal), a smart terminal. The terminal device can communicate with one or more core networks through a radio access network (radio access network, RAN). For example, the terminal device may be a mobile phone (or also referred to as a "cellular" phone), or a computer with a mobile terminal. The terminal device may alternatively be a portable, pocket-size, handheld, computer-integrated or in-vehicle mobile apparatus, and the terminal device in a future NR network, which exchanges voice and/or data with the radio access network. Description of the terminal device is as follows: In this application, the terminal device may further include a relay (Relay), and any device that can perform data communication with the base station may be regarded as the terminal device.

The communications system in the embodiments of this application may be various communications systems, such as a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service. GPRS), a long term evolution (long term evolution, LTE) system, an LTE frequency division duplex (frequency division duplex, FDD) system, an LTE time division duplex (time division duplex, TDD) system, a universal mobile telecommunications system (universal mobile telecommunication system, UMTS), a worldwide interoperability for microwave access (worldwide interoperability for microwave access, WiMAX) communications system, a 5th generation (5th generation, 5G) system, or a new radio (new radio, NR) system.

In the new radio (new radio, NR) system, the access network device can configure time domain resources for the terminal in a form of downlink resource-flexible resource-uplink resource. For example, the access network device may configure the time domain resources for the terminal by delivering time domain resource configuration information. The time domain resource configuration information may indicate downlink resource-flexible resource-uplink resource. The time domain resource configuration information may be one or more of cell-level semi-static configuration information, user-level semi-static information, and user-level dynamic information. The flexible resource may be used to configure a guard period (GP, guard period), and the GP may be understood as a guard period used for uplink-downlink handover. The GP resource may be referred to as an unknown resource or the flexible (Flexible) resource, and a GP symbol may be referred to as a flexible symbol.

Figure 2:
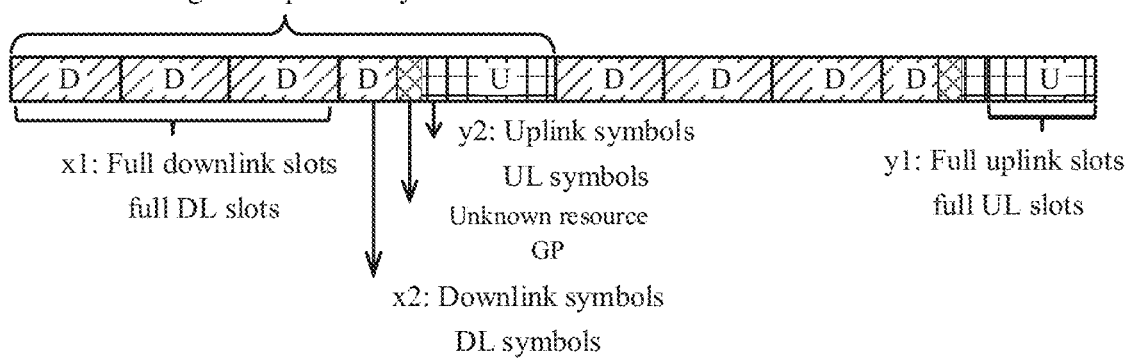
FIG. 2 is a schematic diagram of cell-level semi-static configuration information according to an embodiment of this application.

For example, a time domain resource configured by the cell-level semi-static configuration information is defined by five parameters: X, x1, x2, y1, and y2. FIG. 2 is a schematic diagram of cell-level semi-static configuration information. X represents an assignment periodicity, x1 represents a quantity of continuous full downlink (D) slots in the assignment periodicity, and x2 represents a quantity of downlink (down link, DL) symbols following the x1 full downlink slots; y1 represents a quantity of continuous full uplink (U) slots in the assignment periodicity, and y2 represents a quantity of uplink (up link, UL) symbols preceding the y1 full uplink slots; and a remaining symbol is the unknown (unknown) resource. In user equipment (user equipment, UE)-level semi-static configuration information or user-level dynamic configuration information, the unknown resource is further configured as the downlink resource, the uplink resource, or the unknown resource, to implement dynamic TDD.

Figure 3A:
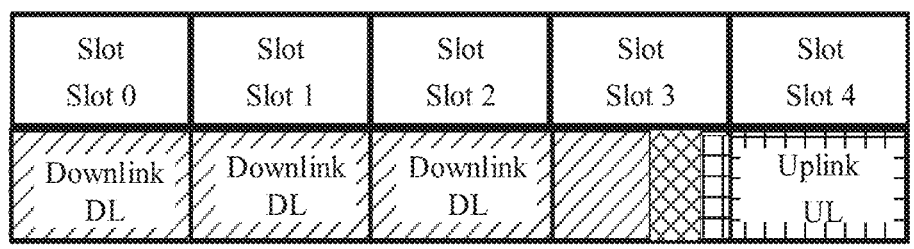
FIG. 3A is an example diagram of cell-level semi-static configuration information according to an embodiment of this application.

For example, as shown in FIG. 3A, reference subcarrier spacing is 30 kHz, and cell-level semi-static signaling may be configured as follows: X=2.5 ms, x1=3, x2=8, y1=1, and y2=2. For the subcarrier spacing of 30 kHz, there are a total of five slots in a period of 2.5 ms. A slot 0, a slot 1, and a slot 2 are full D slots, the first eight symbols of a slot 3 are downlink symbols, two symbols of the slot 3 are uplink symbols, and four symbols of the slot 3 are flexible symbols. A slot 4 is a full U slot, and the middle four symbols of the slot 3 may be used for the GP.

For example, as shown in FIG. 3B, reference subcarrier spacing is 30 kHz, and cell-level semi-static signaling may be configured as follows: X=5 ms, x1=7, x2=6, y1=2, and y2=4. For the subcarrier spacing of 30 kHz, there are a total of 10 slots in a period of 5 ms. The first seven slots, namely, a slot 0, a slot 1, a slot 2, a slot 3, a slot 4, a slot 5, and a slot 6 are full D slots. The first six symbols of an eighth slot, namely, a slot 7, are downlink symbols, the last four symbols of the slot 7 are uplink symbols, and the middle four symbols of the slot 7 are flexible symbols. The middle four symbols of the slot 7 are used for the GP. The last two slots, namely, a slot 8 and a slot 9, are full U slots.

In the foregoing NR technical solution, the GP resource may be configured by using cell-level semi-static signaling, user-level semi-static signaling, or user-level dynamic information. Different terminals have different requirements for a length of the GP resource. For example, different terminals have different requirements for the length of the GP resource due to different geographic locations of the terminals. For example, for most near-end terminal devices, because duration used for transmitting data from the access network device to the near-end terminal devices is relatively long, lengths of GP resources required by the remote terminal devices are small; and for most remote terminal devices, because duration used for transmitting data from the access network device to the remote terminal devices is relatively short, lengths of GP resources required by the near-end terminal devices are relatively large. How to configure an appropriate GP resource for the terminal is a problem that needs to be urgently resolved.

An embodiment of this application provides a solution, which can allocate a GP resource to a terminal based on a requirement of the terminal. According to this solution, the terminal can use a resource other than the GP resource for uplink or downlink, thereby improving utilization of resources. For example, the near-end terminal device does not need a relatively large quantity of GP resources, but needs more uplink time domain resources or downlink time domain resources. For example, when performing downlink multi-flow transmission, the near-end terminal device expects to obtain channel information in a more timely and accurate manner, and needs a relatively large quantity of uplink time domain resources to send SRS.

The following first briefly explains several terms that may be used in this application:

The cell-level semi-static configuration information is used to indicate that symbols included in a time domain resource are an uplink symbol, a downlink symbol, or a flexible symbol. "Cell-level" may be understood as that the configuration information is valid for a terminal in a cell or the configuration information may be sent to the terminal in the cell. "Semi-static" may be understood as that the configuration information may be delivered through high layer signaling, and the high layer signaling may be understood as radio resource control (radio resource control, RRC) layer signaling. For example, the high layer signaling may be a system message, the access network device may broadcast the system message, and the system message may carry the cell-level semi-static configuration information.

The user-level semi-static configuration information is used to indicate that symbols included in a time domain resource are an uplink symbol, a downlink symbol, or a flexible symbol. "User-level" may be understood as that the configuration information is valid for a specific terminal or the configuration information may be sent to the specific terminal. "Semi-static" may be understood as that the configuration information may be delivered through high layer signaling, and the high layer signaling may be understood as radio resource control (radio resource control, RRC) layer signaling. For example, the high layer signaling may be an RRC message, the access network device may send the RRC message to the terminal, and the RRC message may include terminal-level semi-static configuration information.

The user-level dynamic configuration information is used to indicate that symbols included in a time domain resource are an uplink symbol, a downlink symbol, or a flexible symbol. "User-level" may be understood as that the configuration information is valid for a specific terminal or the configuration information may be sent to the specific terminal. "Dynamic" may be understood as that the configuration information may be delivered through physical layer information. For example, the physical layer signaling may be downlink control information (downlink control information, DCI), the access network device may send the DCI through a physical downlink control channel (physical downlink control channel, PDCCH), the DCI may include terminal-level dynamic configuration information, and the PDCCH herein may be a group common (group common, GC) PDCCH.

The foregoing cell-level semi-static configuration information, user-level semi-static configuration information, and user-level dynamic configuration information may be collectively referred to as the time domain resource configuration information.

The GP resource may be referred to as a flexible time domain resource or an unknown time domain resource, and a GP symbol may be referred to as a flexible symbol or an unknown symbol. "Maximum" and "minimum" in this embodiment of this application are only terms, are only used to differentiate different nouns, and impose no limitation.

Figure 4:
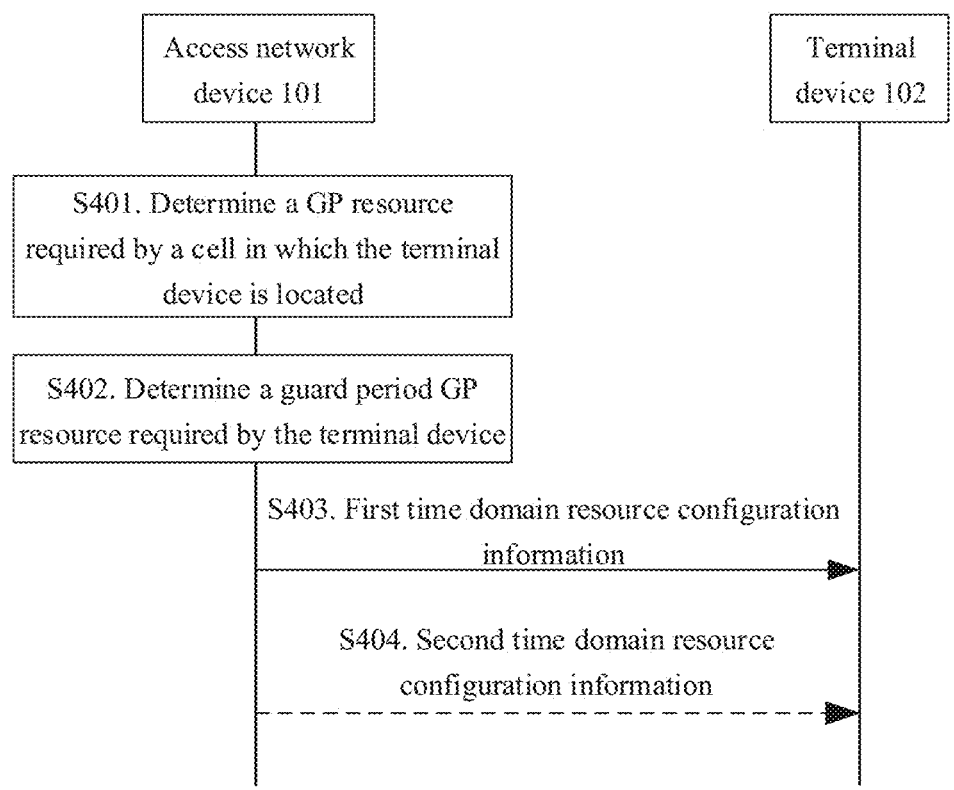
FIG. 4 is a schematic diagram of a time domain resource configuration method according to an embodiment of this application.

The following first describes, with reference to FIG. 4, the technical solution provided in the embodiments of this application. FIG. 4 is a schematic diagram of a time domain resource configuration method according to an embodiment of this application. The method may be used for an access network device or a chip in the access network device. As shown in FIG. 4, S401. Determine a GP resource required by a cell in which a terminal device is located.

The GP resource required by the cell is a GP resource required to ensure uplink synchronization after uplink-downlink handover between a terminal device located at a coverage edge of the cell and the access network device.

Optionally, S401 may be implemented in the following manners:

determining a first GP length based on a maximum coverage distance of the cell; and
determining, based on the first GP length, the GP resource required by the cell in which the terminal device is located; or
determining a second GP length based on uplink-downlink subframe configuration of the cell; and
determining, based on the second GP length, the GP resource required by the cell in which the terminal device is located; or
determining a first GP length based on a maximum coverage distance of the cell;
determining a second GP length based on uplink-downlink subframe configuration of the cell; and
determining, based on a larger one of the first GP length and the second GP length, the GP resource required by the cell in which the terminal device is located.

S401 is optional.

S402. Determine a guard period GP resource required by the terminal device.

The GP resource required by the terminal device is a GP resource required to ensure uplink synchronization after uplink-downlink handover between the terminal device and the access network device.

Optionally, S402 may be implemented in the following manner: determining an uplink timing advance TA measurement value of the terminal device, determining the GP length based on the uplink TA measurement value of the terminal device, and determining the GP resource based on the GP length.

S403. Send first time domain resource configuration information to the terminal device.

Optionally, the first time domain resource configuration information indicates the GP resource required by the cell, and the GP resource required by the cell includes the GP resource required by the terminal device.

Optionally, the first time domain resource configuration information indicates the GP resource required by the terminal device. The GP resource required by the cell is the GP resource required to ensure uplink synchronization after uplink-downlink handover between the terminal device at a coverage edge of the cell and the access network device, namely, a maximum GP resource in GP resources required by terminal devices in coverage of the cell. The first time domain resource configuration information indicates the GP resource required by the cell, which may be understood as that the first time domain resource configuration information indicates a GP resource required by each terminal in the cell.

It should be noted that the first time domain resource configuration information may indicate a GP time domain resource in an implicit indication manner. For example, an uplink time domain resource and a downlink time domain resource may be indicated by using the first time domain resource configuration information, and a time domain resource that is not indicated as an uplink time domain resource or a downlink time domain resource in the first time domain resource configuration information is a flexible time domain resource. For example, the access network device can negotiate with the terminal device to determine that a time domain resource that is not indicated as an uplink time domain resource or a downlink time domain resource in time domain resource configuration information is a flexible time domain resource. Alternatively, the first time domain resource configuration information may indicate a GP time domain resource in an explicit indication manner. For example, the first time domain resource configuration information directly indicates a specific time domain resource as the GP time domain resource.

S404. Send second time domain resource configuration information to the terminal device.

In a first implementation, the second time domain resource configuration information is used to indicate that an available time domain resource is a downlink time domain resource.

In a second implementation, the second time domain resource configuration information is used to indicate that an available time domain resource is an uplink time domain resource.

The available time domain resource is some or all resources other than the GP resource required by the terminal device in the GP resource required by the cell.

S404 is optional.

Only one of the first implementation and the second implementation may be used. For example, the first implementation or the second implementation is used. Alternatively, both the first implementation and the second implementation may be used. For example, the second time domain resource configuration information may indicate that some time domain resources in available time domain resources are uplink time domain resources, and some time domain resources in the available time domain resources are downlink time domain resources.

Optionally, after the second implementation, the method may further include the following steps:
  sending indication information to the terminal device, where the indication information is used to indicate the terminal device to send an uplink signal on the available time domain resource;
  performing interference measurement on the uplink time domain resource by using the uplink signal; and
  when an interference measurement value of the uplink time domain resource is greater than a threshold, skipping performing scheduling on the uplink time domain resource.

Optionally, before the second implementation, the method may further include the following steps:
  sending indication information to the terminal device, where the indication information is used to indicate the terminal device to send an uplink signal on the available time domain resource; and
  performing interference measurement on the available time domain resource by using the uplink signal, where the sending second time domain resource configuration information to the terminal device includes:
  when the available time domain resource is not interfered with or an interference measurement value is less than a threshold, sending the second time domain resource configuration information to the terminal device.

Optionally, after the first implementation, the method may further include the following steps:
  sending a reference signal on the downlink time domain resource;
  notifying the terminal device to receive the reference signal; and
  receiving channel quality indication information on the downlink time domain resource from the terminal device, where the channel quality indication is obtained by measuring the reference signal.

Optionally, the channel quality indication information is a channel quality indication (channel quality indication, QCI).

When a channel quality value of the downlink time domain resource is less than a threshold, no scheduling is performed on the downlink time domain resource.

Optionally, before the first implementation, the method may further include the following steps:
  sending a reference signal on the available time domain resource;
  notifying the terminal device to receive the reference signal on the available time domain resource; and
  receiving channel quality indication information on the available time domain resource from the terminal device, where the downlink channel quality indication is obtained by measuring the reference signal.

Optionally, the channel quality indication information is a channel quality indication (channel quality indication, QCI).

When a channel quality value of the downlink time domain resource is greater than a threshold, the second time domain resource configuration information is sent to the terminal device.

Optionally, in a first alternative implementation of S404, before S403, the method may further include:
  sending indication information to the terminal device, where the indication information is used to indicate the terminal device to send an uplink signal on the available time domain resource; and
  performing uplink interference measurement on the available time domain resource by using the uplink signal, where the available time domain resource is some or all resources other than the GP resource required by the terminal device in the GP resource required by the cell in which the terminal device is located; and
  when the available time domain resource is interfered with or an interference measurement value is greater than a threshold, the first time domain resource configuration information is further used to indicate that the available time domain resource is the GP resource.

Optionally, in a first alternative implementation of S404, before S403, the method may further include:
  sending a reference signal on the available time domain resource;
  notifying the terminal device to receive the reference signal on the available time domain resource; and
  receiving channel quality indication information on the available time domain resource from the terminal device, where the downlink channel quality indication is obtained by measuring the reference signal.

Optionally, the channel quality indication information is a channel quality indication (channel quality indication, QCI).

When a channel quality value of the downlink time domain resource is greater than a threshold, the second time domain resource configuration information is sent to the terminal device.

Optionally, in a third alternative implementation of S404, after S403, the method may further include:
  sending third time domain resource configuration information to the terminal device, where the third time domain resource configuration information is used to indicate that an available time domain resource is an uplink time domain resource or a downlink time domain resource; and
  the available time domain resource is some or all resources other than the GP resource required by the terminal device in the GP resource required by the cell in which the terminal device is located.

Optionally, in the third alternative implementation, when the third time domain resource configuration information is used to indicate that an available time domain resource is an uplink time domain resource, the method further includes:
  sending indication information to the terminal device, where the indication information is used to indicate the terminal device to send an uplink signal on the uplink time domain resource;
  performing interference measurement on the uplink time domain resource by using the uplink signal; and
  when the uplink time domain resource is interfered with and an interference measurement value is greater than a threshold, skipping performing scheduling on the uplink time domain resource.

Optionally, in the third alternative implementation, when the third time domain resource configuration information is used to indicate that an available time domain resource is a downlink time domain resource, the method further includes:

sending a reference signal on the downlink time domain resource;

indicating the terminal device to receive the reference signal; and receiving channel quality indication information on the downlink time domain resource from the terminal device, where the downlink channel quality indication is obtained by measuring the reference signal.

Optionally, the channel quality indication information is a channel quality indication (channel quality indication, QCI).

When a channel quality value of the downlink time domain resource is less than a threshold, no scheduling is performed on the downlink time domain resource.

In FIG. 4, the access network device may be the access network device 101, and the terminal device may be the terminal device 102 or the terminal device 103. For ease of description, the following uses the access network device 101 and the terminal device 102 as an example for description.

Figures 1, 5A:
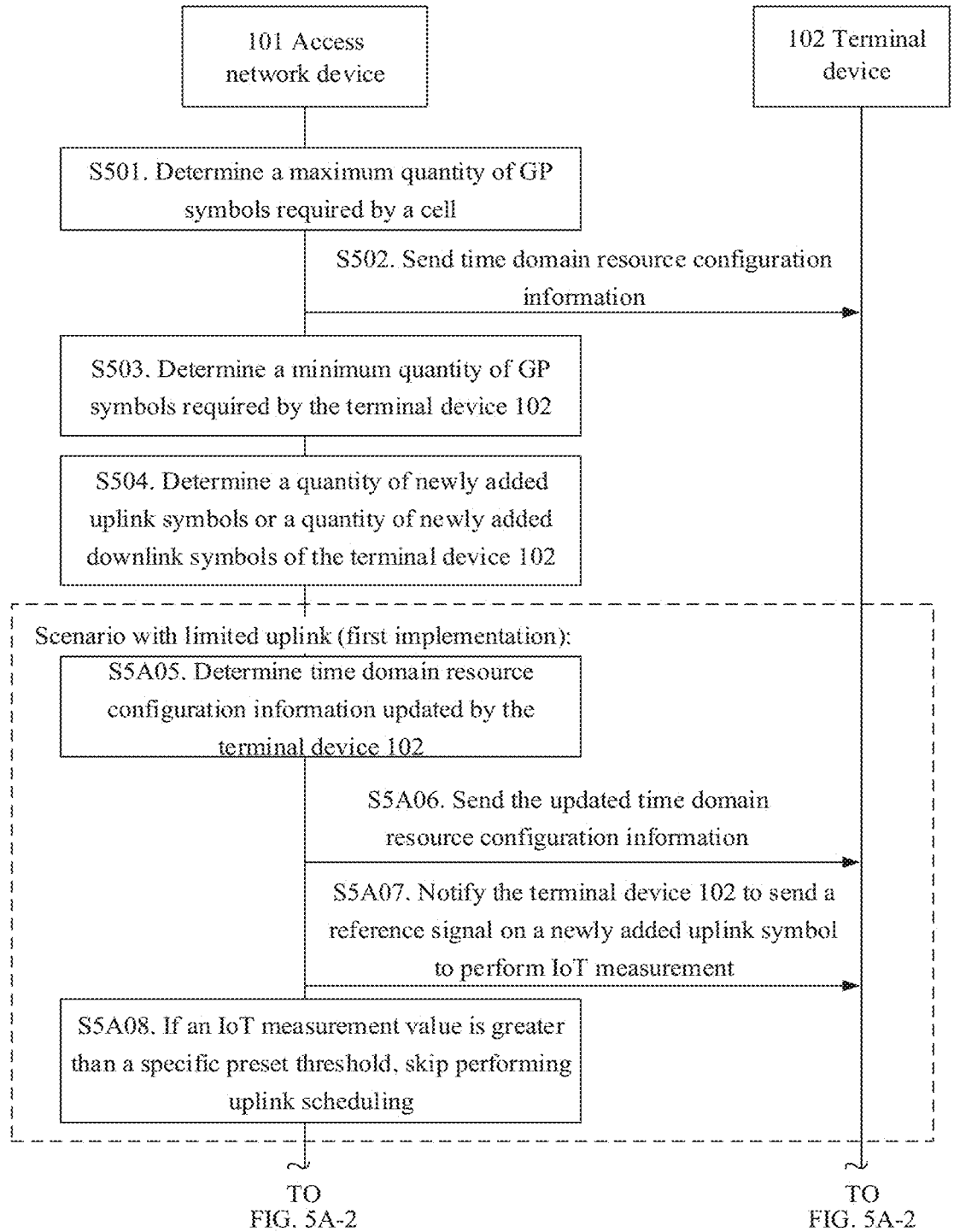
Figures 2, 5A:
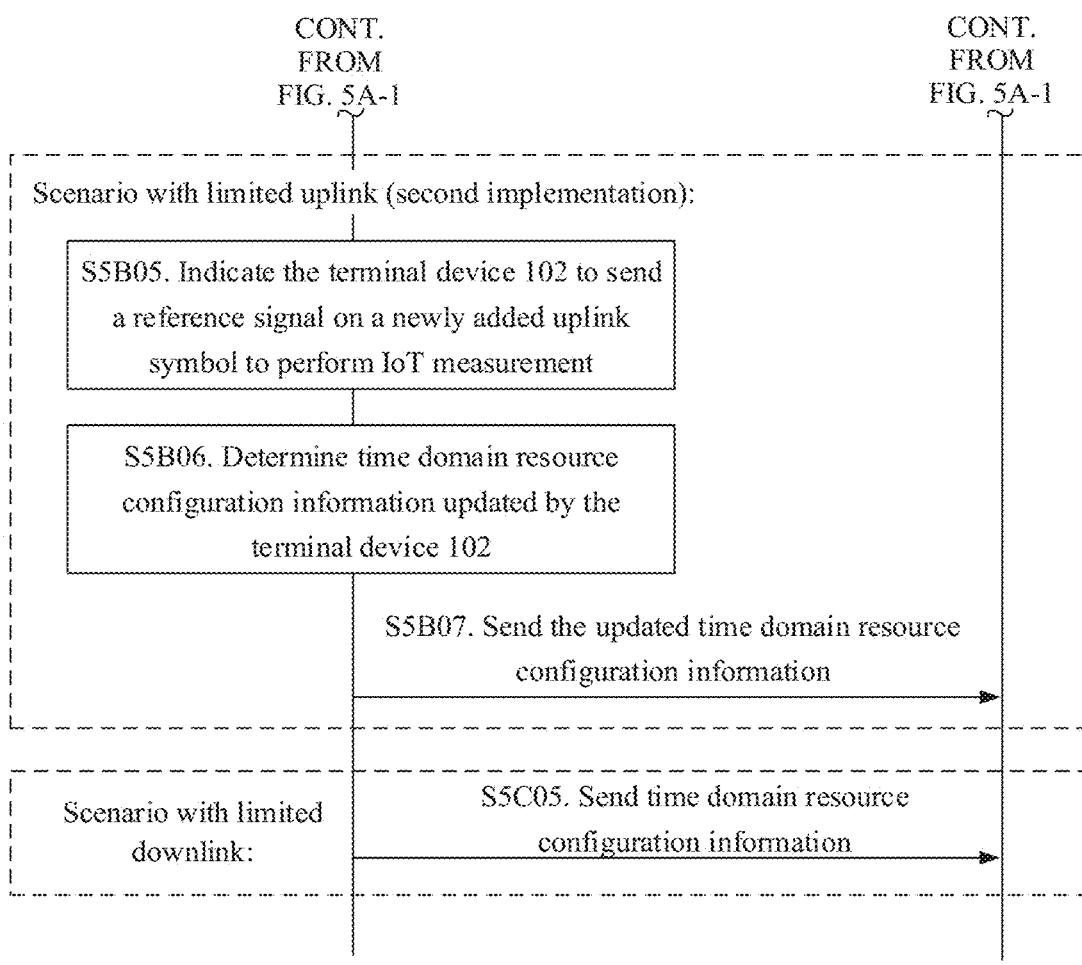

The following further describes the technical solution in this application in a form of an embodiment. FIG. 5A-1 and FIG. 5A-2 are schematic diagrams of a time domain resource configuration method according to an embodiment of this application. The method includes the following steps.

S501. An access network device 101 determines a maximum quantity of GP symbols required by a cell.

The maximum quantity of GP symbols required by the cell may be understood as a quantity of GP symbols required by a most remote terminal device to ensure that the access network device 101 receives an uplink signal from the most remote terminal device, or may be understood as a quantity of GP symbols required to ensure that the access network device 101 can accurately receive an uplink transmission signal from the most remote terminal device after uplink-downlink handover, or may be understood as a quantity of GP symbols required to ensure uplink synchronization after uplink-downlink handover between the terminal device and the access network device. Herein, the cell may be one cell, two cells, or more cells provided by the access network device 101. For example, the access network device 101 provides a cell 1, and the terminal device 102 and the terminal device 103 are in the cell 1. A most remote terminal may be understood as a terminal at a coverage edge of the cell.

In a first implementation, the maximum quantity of GP symbols may be determined based on a maximum coverage distance of the cell (for ease of description, the maximum quantity of GP symbols required by the cell is referred to as G_cell below).

In an example, the access network device 101 may obtain round trip delay (Round Trip Delay, RTD)max based on RTDmax=maximum coverage distance*2/speed of light, and then obtain the GP length based on RTDmax=GP length−M, where M is related to an uplink-downlink handover delay of the terminal and a timing advance offset (TA offset) delay. For example, M is a sum of the uplink-downlink handover delay of the terminal and the TA offset delay. In NR, the uplink-downlink handover delay of the terminal may be 10 μs, and the TA offset delay may be 13 μs. In LTE, the uplink-downlink handover delay of the terminal may be 17 μs, and the TA offset delay may be 20 μs. Then, the quantity of GP symbols may be obtained by dividing the GP length by a symbol length.

For example, the following Table 2 shows an example of the maximum coverage distance of the cell and the maximum quantity of GP symbols.

TABLE 2

| Quantity of guard period GP symbols (subcarrier spacing SCS = 30 kHz) | Maximum cell radius R (km) |
| --- | --- |
| 1 symbol | R ≤ 1.9 |
| 2 symbols | 1.9 ≤ R ≤ 7.3 |
| 3 symbols | 7.3 ≤ R ≤ 12.6 |

As shown in Table 2, when a cell radius≤1.9 km, a corresponding maximum quantity of GP symbols is 1; when 1.9 km≤a cell radius≤7.3 km, a corresponding maximum quantity of GP symbols is 2; or when 7.3 km≤a cell radius≤12.6 km, a corresponding maximum quantity of GP symbols is 3.

In a second implementation, based on the first implementation, the access network device 101 may determine whether uplink-downlink subframe configuration of LTE has been sent to the terminal device in the cell. If the uplink-downlink subframe configuration of the LTE has been sent to the terminal device in the cell, the access network device 101 determines, based on the uplink-downlink subframe configuration of the LTE, that the quantity of GP symbols in the cell is G3. In this case, the access network device 101 determines that the maximum quantity of GP symbols in the cell may be G_cell=max{G1, G3}.

In a third implementation, the access network device 101 may determine whether uplink-downlink subframe configuration of LTE has been sent to the terminal device in the cell. If the uplink-downlink subframe configuration of the LTE has been sent to the terminal device in the cell, the access network device 101 may directly determine, based on the uplink-downlink subframe configuration of the LTE, that the quantity of GP symbols in the cell is G3. In this case, the access network device 101 determines that the maximum quantity of GP symbols in the cell may be G_cell=G3.

Optionally, after the access network device 101 determines the maximum quantity of GP symbols required by the cell, the access network device 101 determines the maximum GP resource required by the cell.

Mutual reference may be made to content in S501 and S401.

S502. The access network device 101 sends time domain resource configuration information to the terminal device 102, where the time domain resource configuration information indicates the maximum GP resource required by the cell.

The time domain resource configuration information may be the cell-level semi-static configuration information.

Optionally, before S502, the access network device 101 may determine the length of the GP resource based on the maximum quantity of GP symbols in the cell, and then determine the cell-level semi-static configuration information. For example, the access network device 101 may determine values of x1, x2, y1, and y2 in the cell-level semi-static configuration information.

Correspondingly, the terminal may receive the cell-level semi-static configuration information, and then configure the GP resource.

Mutual reference may be made to content in S502 and S403.

S503. The access network device 101 determines a minimum quantity of GP symbols required by the terminal device 102.

The minimum quantity of GP symbols required by the terminal device 102 may be understood as a quantity of GP symbols required to ensure that the access network device 101 accurately receives an uplink signal from a terminal device 102, or may be understood as a quantity of GP symbols required to ensure that the access network device 101 can accurately receive an uplink transmission signal from the terminal device 102 after uplink-downlink handover, or may be understood as a quantity of GP symbols required to ensure uplink synchronization after uplink-downlink handover between the terminal device 102 and the access network device 101.

In an implementation, the access network device 101 may determine, based on an uplink TA measurement result of the terminal device 102, the minimum quantity G2 of GP symbols required by the terminal device 102. For example, the access network device 101 measures an uplink reference signal sent by the terminal device 102, and calculates a TA measurement value of the terminal device 102. The TA measurement value indicates a minimum one-way delay required for a signal to be transmitted from the terminal device 102 to the access network device 101. A round trip delay of the signal from the terminal device 102 to the access network device 101 is twice the TA measurement value. If possible, one or more factors such as a handover time required for the uplink-downlink handover of the terminal device 102 and a handover time required for the uplink-downlink handover of the access network device 101 may be added. Then a minimum time required for ensuring a round trip of the signal of the terminal device 102 may be obtained, and the minimum quantity of GP symbols required by the terminal device 102 can be obtained by dividing the minimum time by the symbol length.

Figure 5B:
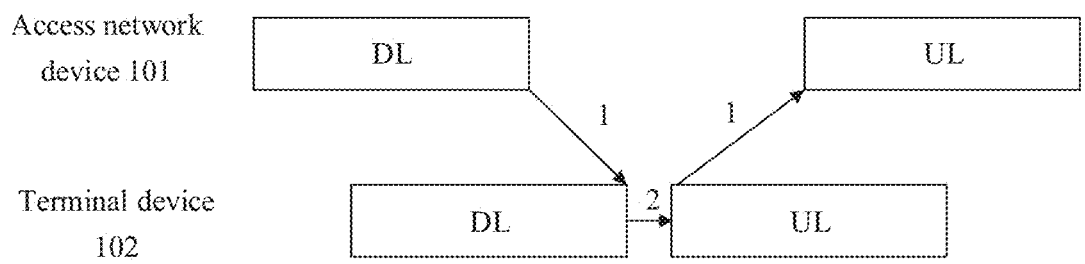
FIG. 5B is a schematic diagram of timing advance according to an embodiment of this application.

As shown in FIG. 5B, an arrow 1 represents the one-way delay between the access network device 101 and the terminal device 102, and an arrow 2 represents a minimum time required for the uplink-downlink handover of the terminal device 102 and the time required for the uplink-downlink handover of the access network device 101. For example, the time required for the uplink-downlink handover of the access network device 101 may be a timing advance offset (TA offset) delay. The GP length corresponding to the minimum quantity of GP symbols may be 2*one-way delay (arrow 1)+minimum time required for the uplink-downlink handover of the terminal device 102+time (arrow 2) required for the uplink-downlink handover of the access network device 101.

For example, the following Table 3 shows an example of the TA measurement value of the terminal device and the minimum quantity of GP symbols.

TABLE 3

| Timing advance TA measurement value (μs) | Quantity of required GP symbols (subcarrier spacing 30 kHz) |
|---|---|
| TA ≤ 21.68 | 1 |
| 21.68 ≤ TA ≤ 57.35 | 2 |
| 57.35 ≤ TA ≤ 93.03 | 3 |

As shown in Table 3, when the TA measurement value is less than or equal to 21.68 μs, the minimum quantity of GP symbols required by the terminal device 102 is 1, when the TA measurement value is greater than or equal to 21.68 and less than or equal to 57.35, the minimum quantity of GP symbols required by the terminal device 102 is 2; or when the TA measurement value is greater than or equal to 57.35 and less than or equal to 93.03, the minimum quantity of GP symbols required by the terminal device 102 is 3.

Optionally, in the foregoing implementation, an initial TA measurement value may be obtained by measuring a preamble sequence in a physical random access channel (physical random access channel, PRACH). Alternatively, after the terminal device accesses a system, the TA measurement value may be obtained by measuring an SRS reference signal. For example, after the terminal device accesses the system, the initial TA measurement value may be adjusted by measuring the SRS reference signal, to update the TA measurement value.

Optionally, in the foregoing embodiment, the access network device 101 may alternatively calculate the TA measurement value of the terminal device 102 by measuring a DMRS (Demodulation RS, demodulation reference signal) on a physical uplink shared channel (physical uplink shared channel, PUSCH).

Optionally, the access network device 101 determines a minimum quantity of GP symbols required by the terminal device 102, thereby determining the minimum GP resource required by the terminal device 102.

Mutual reference may be made to S503 and S402.

S504. The access network device 101 determines a quantity of newly added uplink symbols or a quantity of newly added downlink symbols of the terminal device 102 based on the maximum quantity of GP symbols in the cell and the minimum quantity of GP symbols required by the terminal device 102.

For one terminal device 102, the access network device 101 may determine, as the newly added uplink symbols or the newly added downlink symbols of the terminal device 102, some or all of symbols corresponding to a quantity of symbols that is obtained by deducting the minimum quantity of GP symbols from the maximum quantity of GP symbols.

For example, if G_UE is less than G_cell, the access network device 101 determines the newly added downlink symbols or the newly added uplink symbols of the terminal device 102 based on a demand state of uplink and downlink physical channels and a signal physical resource of the system, the maximum quantity of GP symbols, and the minimum quantity of GP symbols.

Optionally, for a scenario with limited uplink resources, after S504, the following two implementations are provided.

S5A05 to S5A07 are the first implementation of the scenario with limited uplink resources:

S5A05. After determining a quantity of uplink symbols that can be added, the access network device 101 determines time domain resource configuration information updated by the terminal device 102.

Mutual reference may be made to S5A05 and S404.

S5A06. Send the updated time domain resource configuration information to the terminal device 102.

For example, the access network device 101 may send time domain resource configuration through UE-level RRC signaling, where the time domain resource configuration indicates the newly added uplink symbol.

Optionally, for the terminal device 102, the access network device 101 performs scheduling selection on a physical channel and a signal on all available uplink symbol resources.

S5A07. The access network device 101 may notify the terminal device 102 to send a reference signal on the newly added uplink symbol (y_add1) to perform IoT measurement.

For example, the access network device 101 may notify the terminal device 102 through DCI signaling.

The reference signal is, for example, an SRS. The access network device 101 separately performs interference over thermal (interference over thermal, IoT) measurement on the newly added uplink symbols.

S5A08. If an IoT measurement value is greater than a specific preset threshold, skip performing uplink scheduling.

Because the IoT measurement value is greater than the specific preset threshold, it indicates that the uplink symbol is strongly interfered with, and the access network device 101 skips performing scheduling on the uplink physical channel and the signal on the strongly interfered uplink symbol resource.

Optionally, in S5A07, after the access network device 101 configures a newly added y_add1 symbol and an original (y2) symbol as the uplink symbols, the access network device 101 may further indicate the terminal device 102 to send a reference signal on the y_add1 symbol and the y2 symbol. For example, the access network device 101 notifies, through RRC signaling or DCI signaling, the terminal device 102 to send a reference signal on the added y_add1 and y2 symbols. The reference signal is, for example, an SRS. The access network device 101 may perform interference measurement on the uplink symbols y_add1+y2; and the access network device 101 determines, based on an actually obtained IoT measurement result on the uplink symbols y_add1+y2, a quantity of uplink symbols that can be actually used by the terminal device on uplink. For the terminal device 102, the access network device 101 performs scheduling on a physical channel and a signal on all available uplink symbol resources, and the access network device 101 skips performing scheduling selection on the uplink physical channel and the signal on the strongly interfered uplink symbol resource. To be specific, for y_add1, a quantity of available uplink symbols that are not strongly interfered with is y_add2, and for y2, a quantity of available uplink symbols that are not strongly interfered with is y2_update, so that a quantity of uplink symbols that can be actually used by the terminal device is y2_new=y2_update+y_add2.

Optionally, in S5A07, after the access network device 101 configures a y_add1 symbol, a y2 symbol, and a y1 slot as uplink time domain resources, the access network device 101 may further indicate the terminal device to send a reference signal on the y_add1 symbol, the y2 symbol, and the y1 slot. For example, the access network device 101 may notify, through RRC signaling or DCI signaling, the terminal device 102 to send a reference signal on the y_add1 symbol, the y2 symbol, and the y1 slot. The reference signal is, for example, an SRS. The access network device 101 performs interference measurement on all uplink symbols; and the access network device 101 determines, based on an actually obtained IoT measurement result on all the uplink symbols, a quantity of uplink symbols that can be actually used by the terminal device on uplink. For the terminal device 102, the access network device 101 performs scheduling on a physical channel and a signal on all available uplink symbol resources, and the access network device 101 skips performing scheduling selection on the uplink physical channel and the signal on the strongly interfered uplink symbol resource.

S5B05 to S5B07 are the second implementation of the scenario with limited uplink resources.

S5B05. The access network device 101 may indicate the terminal device 102 to send a reference signal on the newly added uplink symbol to perform IoT measurement.

For example, the access network device 101 may indicate the terminal device 102 through DCI signaling.

The reference signal is, for example, an SRS. The access network device 101 separately performs interference over thermal (interference over thermal, IoT) measurement on the added available uplink symbol y_add1. If the IoT measurement value is greater than the specific preset threshold, it indicates that the available uplink symbol is strongly interfered with. A quantity of symbols whose IoT measurement values are less than the preset threshold is counted, to obtain a quantity y_add2 of available uplink symbols that are not strongly interfered with, so that a quantity of uplink symbols that can be actually used by the terminal device is obtained: y2_new=y2+y_add2. For the terminal device 102, the access network device 101 performs scheduling on a physical channel and a signal on all available uplink symbol resources, and the access network device 101 skips performing scheduling selection on the uplink physical channel and the signal on the strongly interfered available uplink symbol resource.

It should be noted that the access network device 101 performs interference measurement on the added available uplink symbol y_add1. A specific implementation is as follows: Energy of interference and noise can be obtained by deducting energy of demodulated required signals from energy of all required signals, interference, and thermal noise received by the access network device 101.

S5B06. After determining the quantity of newly added uplink symbols that are not interfered with, the access network device 101 determines time domain resource configuration information updated by the terminal device 102.

S5B07. The access network device 101 sends the updated time domain resource configuration information to the terminal device 102.

For example, the access network device 101 may send time domain resource configuration information through UE-level RRC signaling.

Optionally, for the terminal device 102, the access network device 101 performs scheduling selection on a physical channel and a signal on all available uplink symbol resources. Optionally, the access network device 101 does not deliver the UE-level RRC signaling, but directly sends DCI signaling, and skips performing resource allocation on the uplink channel and the signal on the available uplink symbol that is strongly interfered with. Mutual reference may be made to S5B07 and S404.

Optionally, for a scenario with limited downlink, this embodiment of this application provides the following implementation.

S5C05. The access network device 101 sends time domain resource configuration information to the terminal device 102, where the time domain resource configuration information may indicate that the available time domain resource is a downlink time domain resource.

The time domain resource configuration information may be user-level configuration information such as user-level semi-static configuration information or user-level dynamic configuration information.

The available time domain resource is some or all resources other than the minimum GP resource in the maximum GP resource.

Mutual reference may be made to S5C05 and S404.

For example, for a scenario with limited downlink resources of the terminal device 102, a quantity of original available uplink symbols remains unchanged, and the access network device 101 determines that a quantity of downlink symbols that can be added for the terminal device 102 is x_add=G_cell−G_UE, and that a quantity of downlink symbols that can be actually used by the terminal device 102 is x2_new=x2+x_add.

For example, for a scenario with limited uplink resources of the terminal device 102, the access network device 101 determines, based on the maximum quantity of GP symbols and the minimum quantity of GP symbols, the quantity of downlink symbols that can be actually used by the terminal device 102. A manner may be specifically included:

Correspondingly, for the terminal device 102, the access network device 101 performs scheduling selection on a downlink physical channel and a signal on all available downlink symbol resources.

In this embodiment of this application, the access network device 101 determines, based on uplink and downlink physical channels and a demand status of a signal physical resource of the current system, and an uplink IoT measurement result, the downlink resource or the uplink resource that can be actually used by the terminal device. This can effectively use resources, and can also avoid interference from an access network device 101 in a neighboring cell and a remote access network device 101 and interference between uplink and downlink. The access network device 101 notifies the terminal device 102 of the quantity of available uplink symbols or the quantity of available downlink symbols, thereby implementing UE-level semi-static or dynamic configuration of the GP and flexible and dynamic uplink-downlink resource allocation.

Figure 6:
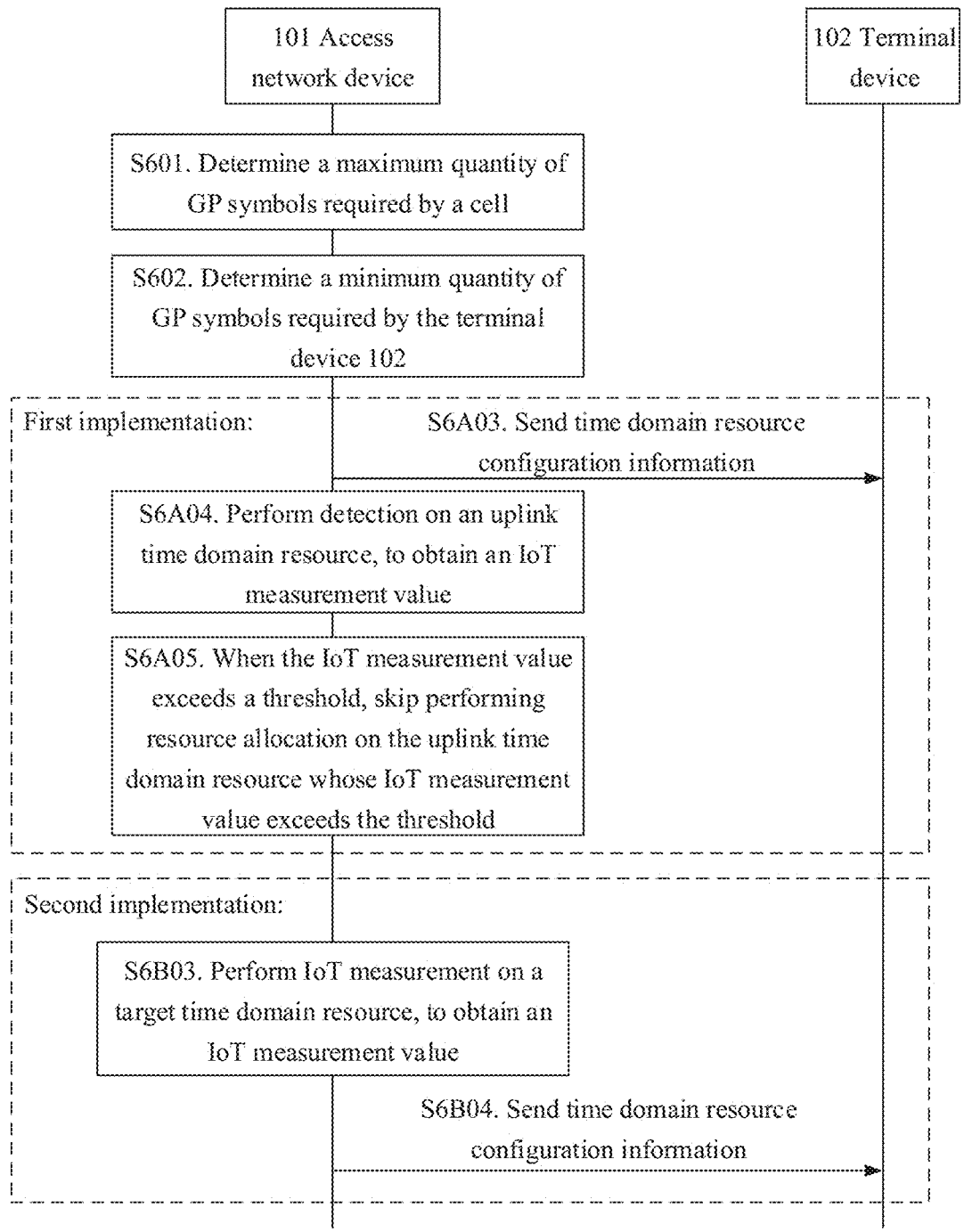
FIG. 6 is another schematic diagram of a time domain resource configuration method according to an embodiment of this application.

The following further provides description with reference to FIG. 6. FIG. 6 is a schematic diagram of a time domain resource configuration method according to an embodiment of this application.

S601. An access network device 101 determines a maximum quantity of GP symbols required by a cell.

It should be noted that step S601 is an optional step.

S602. The access network device 101 determines a minimum quantity of GP symbols required by a terminal device 102.

For steps S601 and S602, reference may be made to steps S501 and S503 in the embodiment shown in FIG. 5A-1. Details are not described herein again.

After S602, a first implementation is as follows:

S6A03. The access network device 101 sends time domain resource configuration information to the terminal device 102.

The time domain resource configuration information may be user-level semi-static or user-level dynamic time domain resource configuration information, and indicate a minimum GP resource.

Optionally, in the time domain resource configuration information, a target time domain resource may be configured as an uplink time domain resource or a downlink time domain resource.

The target time domain resource may be some or all time domain resources in a maximum quantity of GP symbol resources other than a minimum quantity of GP symbol resources.

Optionally, S6A04. The access network device 101 performs detection on the uplink time domain resource, to obtain an IoT measurement value.

Optionally, S6A05. When the IoT measurement value exceeds a threshold, the access network device 101 skips performing resource allocation on an uplink time domain resource whose IoT measurement value exceeds the threshold.

After S602, a second implementation is as follows:

S6B03. The access network device 101 performs IoT measurement on a target time domain resource, to obtain an IoT measurement value.

The target time domain resource may be some or all time domain resources in a maximum quantity of GP symbol resources other than a minimum quantity of GP symbol resources. For the target time domain resource, the access network device 101 performs interference detection, to obtain the IoT measurement value. When the IoT measurement value exceeds a threshold, the access network device 101 determines a time domain resource whose IoT measurement value is greater than the threshold, and the time domain resource whose IoT measurement value is greater than the threshold is an interfered resource.

S6B04. The access network device 101 sends time domain resource configuration information to the terminal device 102.

The time domain resource configuration information may be user-level semi-static or user-level dynamic time domain resource configuration information, and indicate a GP resource. The GP resource is the minimum GP resource+[interfered resource in (the maximum GP resource−the minimum GP resource)].

Figure 7:
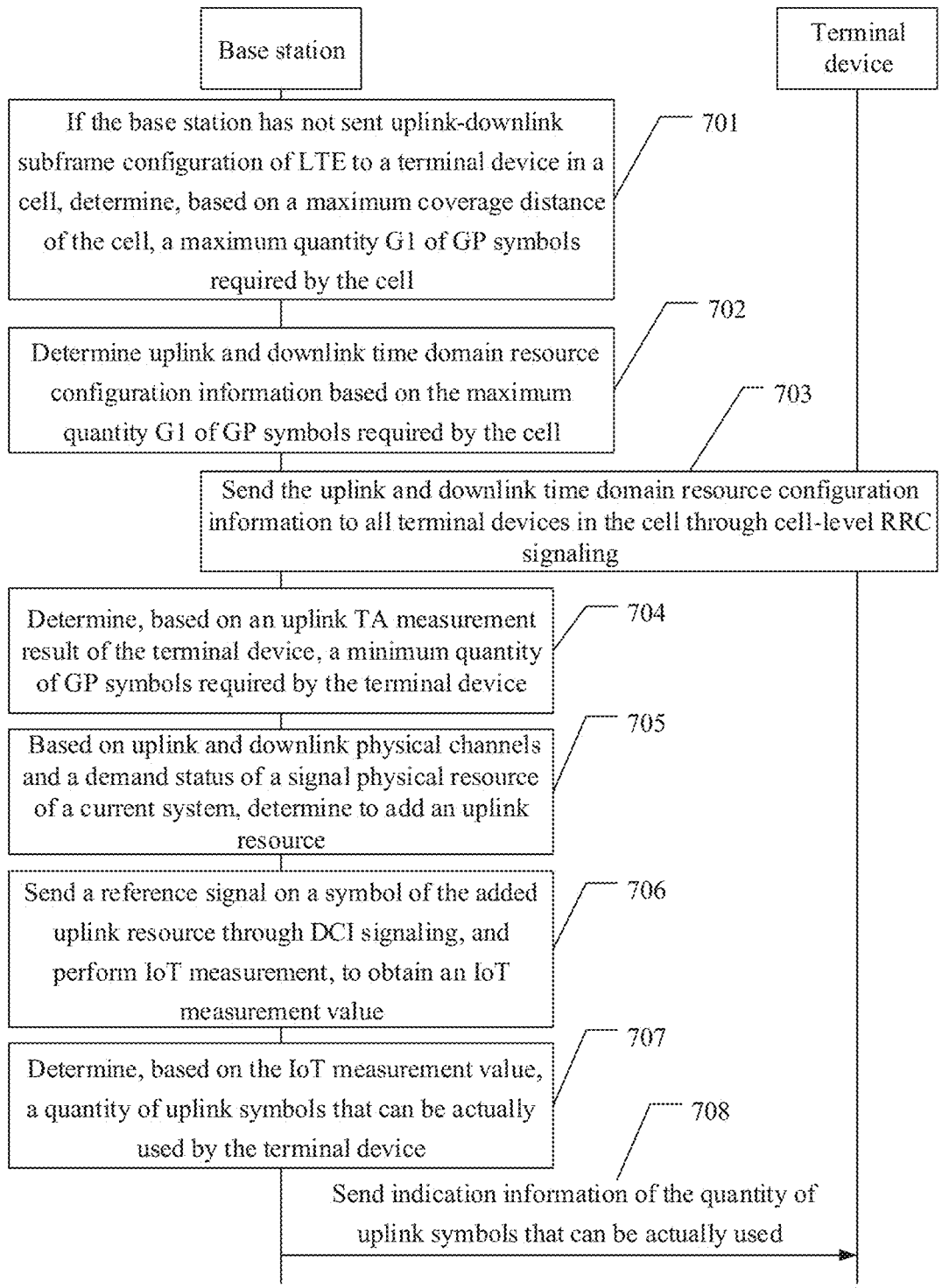
FIG. 7 is another schematic diagram of a time domain resource configuration method according to an embodiment of this application.
Figure 8:
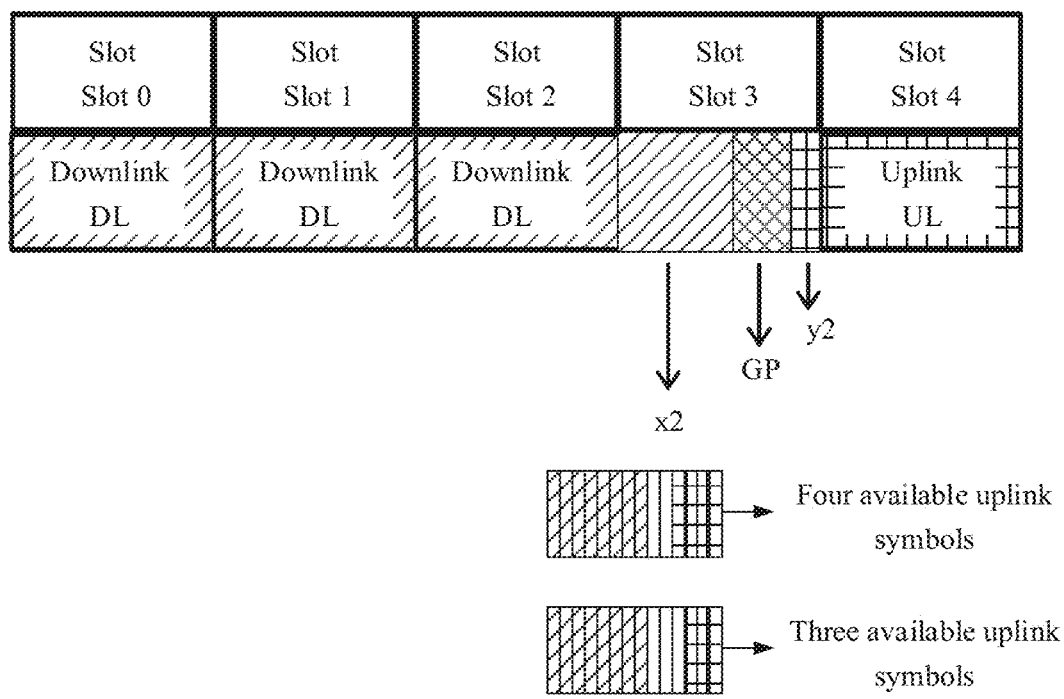
FIG. 8 is a schematic diagram of current slot configuration of a terminal device according to an embodiment of this application.

The following further provides description with reference to specific examples in FIG. 7 and FIG. 8.

FIG. 7 is a schematic diagram of another embodiment of a configuration method for uplink and downlink resources according to an embodiment of this application. The method includes the following steps.

701. If an access network device 101 has not sent uplink-downlink subframe configuration of LTE to a terminal device in a cell, a base station determines, based on a maximum coverage distance of the cell, a maximum quantity G1 of GP symbols required by the cell.

If it is assumed that the maximum coverage distance of the cell is 14 km, the maximum quantity G1 of GP symbols required by the cell is equal to 4.

702. The access network device 101 determines uplink and downlink time domain resource configuration information based on the maximum quantity G1 of GP symbols required by the cell.

An example of a C-band NR system is used for description. Subcarrier spacing used on the band is 30 kHz, and an uplink-downlink slot assignment periodicity is 2.5 ms, and therefore, X=2.5 ms. The access network device 101 determines, based on uplink and downlink service volumes, that x1=3 and y1=1, and then determines, based on resources required by an uplink physical channel and a signal, such as an SRS or an uplink control channel (physical uplink control channel, PUCCH), that a quantity y2 of uplink symbols is equal to 2.

If there is no existing slot configuration of the LTE in the current system, a quantity G_cell of GP symbols that actually need to be configured in the cell is equal to G1, that is, 4. In this case, a quantity x2 of corresponding downlink symbols is equal to 14−y2−G_cell, that is, 8.

It may be understood that the access network device 101 may alternatively determine, based on resources required by a downlink physical channel and the signal, that the quantity x2 of downlink symbols is equal to 8, and then determine, based on a maximum coverage distance of the cell, that a maximum quantity G1 of GP symbols required by the cell is equal to 4. If there is no inventory LTE in the current system. G_cell=G1=4. In this case, the quantity y2 of corresponding uplink symbols is equal to 14−x2−G_cell, that is, 2.

703. The access network device 101 sends the uplink and downlink time domain resource configuration information to all terminal devices in the cell through cell-level RRC signaling.

The access network device 101 may notify all the terminal devices in the cell of the uplink and downlink time domain resource configuration information through a system information block (system information block, SIB1) message. That is, current slot configuration information is: X=2.5 ms, x1=3, x2=8, y1=1, and y2=2. FIG. 8 is a schematic diagram of current slot configuration of a terminal device.

704. The access network device 101 determines, based on an uplink TA measurement result of the terminal device, a minimum quantity of GP symbols required by the terminal device.

The access network device 101 performs IoT measurement on an uplink physical channel and a signal of a specific terminal device. For example, the access network device 101 performs IoT measurement on a physical random access channel (physical random access channel, PRACH) and an SRS, updates a TA measurement value of the terminal device based on an IoT measurement result, and determines, based on a correspondence between the TA measurement value and the GP symbol, a minimum quantity G2 of GP symbols required by the terminal device.

For example, if an actual TA measurement value of the terminal device is 50 μs, according to Table 3, a corresponding minimum quantity G2 of GP symbols is equal to 2. In this case, a quantity G_UE of GP symbols that need to be configured for the terminal device is equal to G2, namely, 2 symbols.

705. Based on uplink and downlink physical channels and a demand status of a signal physical resource of the current system, the access network device 101 determines to add an uplink resource.

Based on the uplink and downlink physical channels and the demand status of the signal physical resource of the current system, the access network device 101 determines to add the uplink resource. If an SRS resource of a near-end user in the current system is limited and the access network device 101 determines to add an available uplink resource, a quantity x2 of downlink symbols is fixedly set to 8, and a quantity y_add of available uplink symbols that is equal to 2 is added.

706. The access network device 101 sends a reference signal on a symbol of the added uplink resource through DCI signaling, and performs IoT measurement, to obtain an IoT measurement value.

For example, the access network device 101 notifies, through the DCI signaling, the terminal device to send an SRS signal on symbols 10, 11, 12, and 13 on a slot (Slot) 3. The access network device 101 performs IoT measurement on the symbols 10 to 13 on the slot 3.

707. The access network device 101 determines, based on the IoT measurement value, a quantity of uplink symbols that can be actually used by the terminal device.

If IoT measurement values on the four symbols are all less than a specific threshold, it is determined that all the four symbols can be used by the terminal device to perform uplink transmission, and the quantity of uplink symbols that can be actually used by the terminal device is 4. As shown in FIG. 8, if an IoT measurement value on the symbol 10 is greater than a specific threshold, only symbols 11 to 13 can be used by the terminal device to perform uplink transmission, and the quantity of uplink symbols that can be actually used by the terminal device is 3.

708. The access network device 101 sends, to the terminal device, indication information of the quantity of uplink symbols that can be actually used.

The access network device 101 notifies, through the UE-level RRC signaling or the DCI signaling, the terminal device of a quantity of symbols that are to be used for uplink transmission and downlink transmission (for example, x2=8, and y2_new=4), so that the terminal device determines a quantity of actually used GP symbols and a GP location.

In this embodiment of this application, the access network device 101 determines, based on the measured TA value and the uplink IoT measurement value, the quantity of GP symbols actually required by the terminal device and the quantity of available uplink symbols, and the UE-level semi-static or dynamic configuration of the quantity of GP symbols and the quantity of uplink symbols is implemented through a combination of cell-level SIB1 signaling and the UE-level RRC signaling, thereby implementing effective utilization of system resources and improving system performance. In the prior art, the quantity and locations of GP symbols, and the quantity of uplink symbols are statically configured. Compared with the prior art, in this embodiment of this application, the quantity of uplink symbols of the near-end terminal device is increased to 4, thereby increasing available resources of an uplink SRS and facilitating improvement of the system performance.

Figure 9:
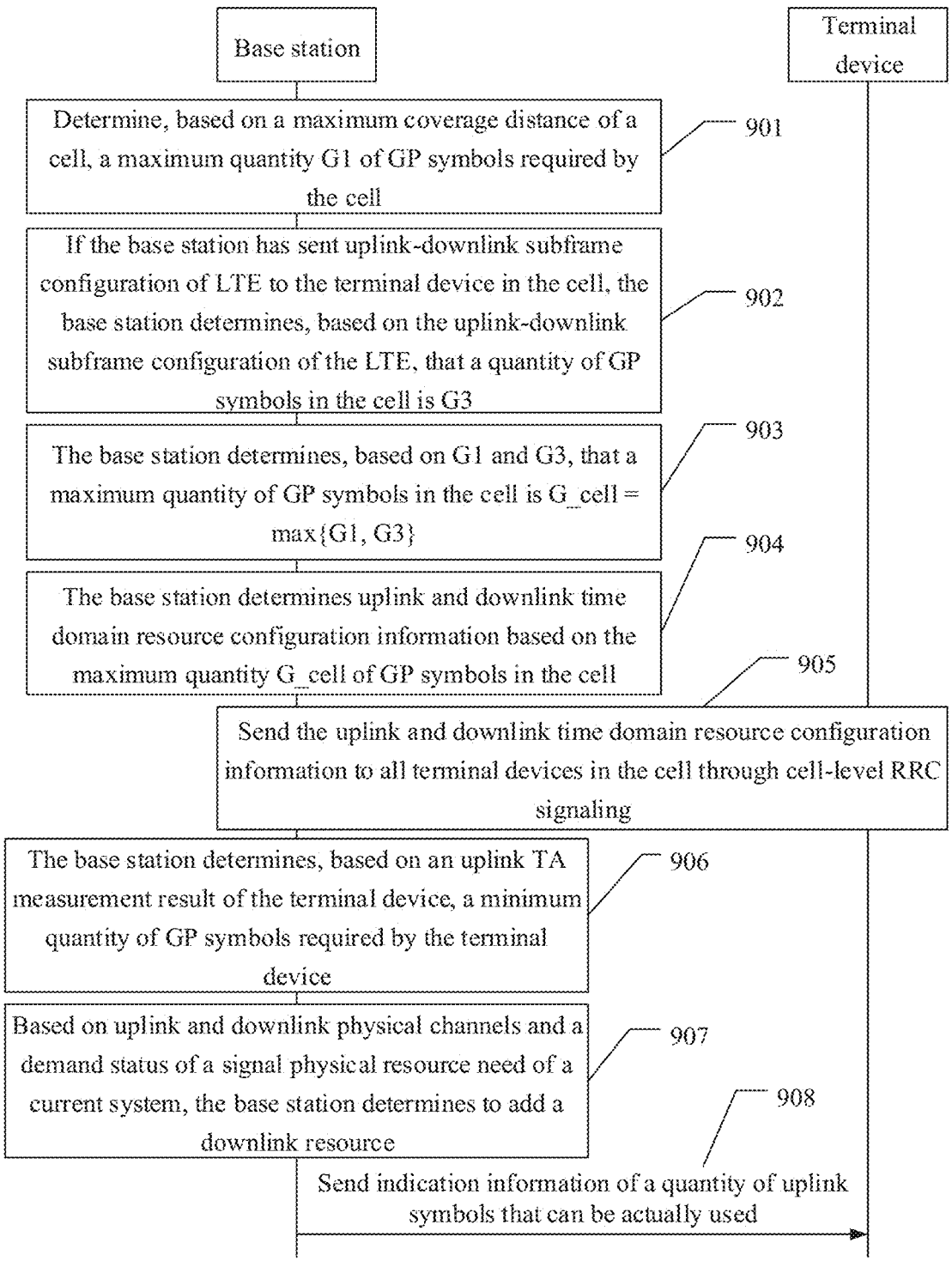
FIG. 9 is another schematic diagram of a time domain resource configuration method according to an embodiment of this application.

FIG. 9 is a schematic diagram of another embodiment of a configuration method for uplink and downlink resources according to an embodiment of this application. The method includes the following steps.

901. An access network device 101 determines, based on a maximum coverage distance of a cell, a maximum quantity G1 of GP symbols required by the cell.

If it is assumed that the maximum coverage distance of the cell is 14 km, the maximum quantity G1 of GP symbols required by the cell is equal to 4.

902. If the access network device 101 has sent uplink-downlink subframe configuration of LTE to a terminal device in the cell, the access network device 101 determines, based on the uplink-downlink subframe configuration of LTE, that the quantity of GP symbols in the cell is G3.

There is existing slot configuration of LTE in a current system, and the quantity G3 of GP symbols in the existing slot configuration of LTE is set to 4.

903. The access network device 101 determines, based on G1 and G3, that a maximum quantity G_cell of GP symbols in the cell is equal to max{G1, G3}.

If there is the existing slot configuration of LTE in the current system, and the quantity G3 of GP symbols in the existing slot configuration of LTE is set to 4, a quantity G_cell of GP symbols that are actually configured by the access network device 101 for the cell is equal to max{G1, G3}, that is, 4.

904. The access network device 101 determines uplink and downlink time domain resource configuration information based on the maximum quantity G_cell of GP symbols in the cell.

An example of a C-band NR system is used for description. Subcarrier spacing used on the band is 30 kHz, and an uplink-downlink slot assignment periodicity is 5 ms, and therefore, X=5 ms. The access network device 101 determines, based on uplink and downlink service volumes, that x1=7 and y1=2, and then determines, based on resources required by an uplink physical channel and a signal, such as an SRS or a PUCCH, that a quantity y2 of uplink symbols is equal to 4. In this case, a quantity x2 of corresponding downlink symbols is equal to 6.

905. The access network device 101 sends the uplink and downlink time domain resource configuration information to all terminal devices in the cell through cell-level RRC signaling.

Figure 10:
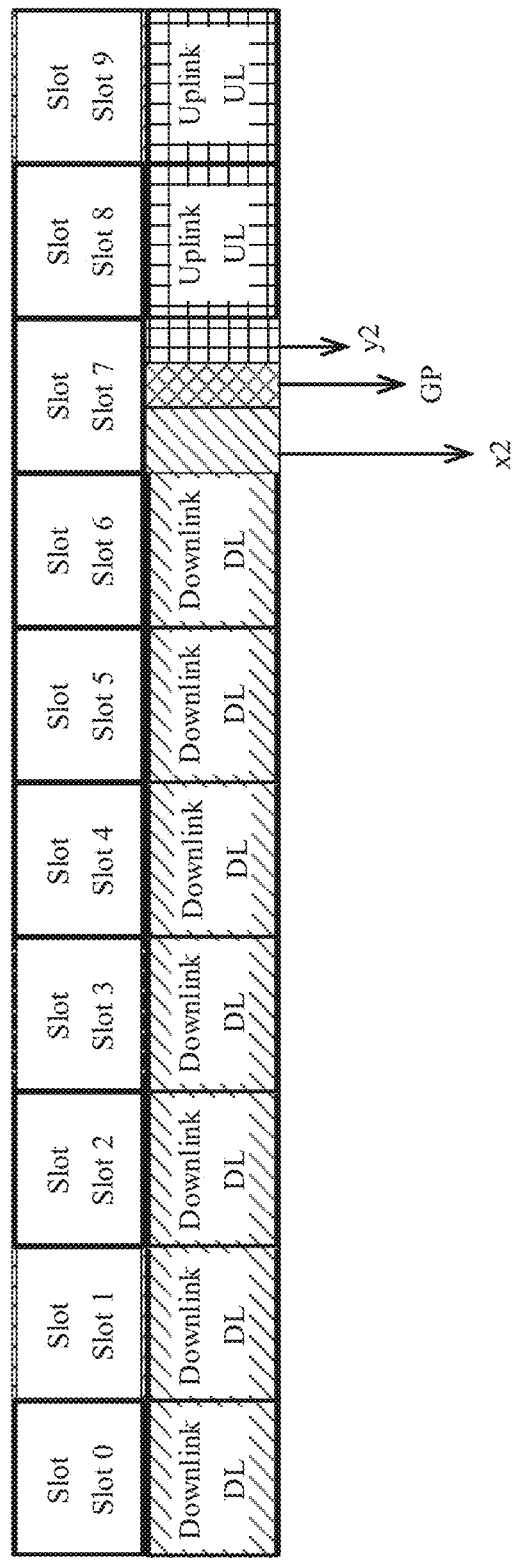
FIG. 10 is a schematic diagram of current slot configuration of a terminal device according to an embodiment of this application.

The access network device 101 may notify all the terminal devices in the cell of the uplink and downlink time domain resource configuration information through an SIB1 message. That is, current slot configuration information is: X=5 ms, x1=7, x2=6, y1=2, and y2=4. FIG. 10 is a schematic diagram of current slot configuration of a terminal device.

906. The access network device 101 determines, based on an uplink TA measurement result of the terminal device, a minimum quantity of GP symbols required by the terminal device.

The access network device 101 performs IoT measurement on an uplink physical channel and a signal of a specific terminal device. For example, the access network device 101 performs IoT measurement on a PRACH and an SRS, updates a TA measurement value of the terminal device based on an IoT measurement result, and determines, based on a correspondence between the TA measurement value and the GP symbol, a minimum quantity G2 of GP symbols required by the terminal device.

For example, if an actual TA measurement value of the terminal device is 50 μs, according to Table 3, a corresponding minimum quantity G2 of GP symbols is equal to 2. In this case, a quantity G_UE of GP symbols that need to be configured for the terminal device is equal to G4, namely, 2 symbols.

907. Based on uplink and downlink physical channels and a demand status of a signal physical resource of the current system, the access network device 101 determines to add a downlink resource.

Based on the uplink and downlink physical channels and the demand status of the signal physical resource of the current system, the access network device 101 determines to add the downlink resource. The quantity y2 of uplink symbols is fixedly set to 4, and a quantity x2_new of downlink symbols that can be actually used by the terminal device is equal to x_add+x2, that is, 4+6=10.

908. The access network device 101 sends, to the terminal device, indication information of the quantity of downlink symbols that can be used.

The access network device 101 notifies, through the UE-level RRC signaling or the DCI signaling, the terminal device of a quantity of symbols that are to be used for uplink transmission and downlink transmission (for example, x2_new=10, and y2=4), so that the terminal device determines a quantity of actually used GP symbols and a GP location.

In this embodiment of this application, the access network device 101 determines, based on the measured TA value, the quantity of GP symbols actually required by the terminal device and the quantity of available downlink symbols, and the UE-level semi-static or dynamic configuration of the quantity of GP symbols and the quantity of downlink symbols is implemented through a combination of cell-level SIB1 signaling and the UE-level RRC signaling, thereby implementing effective utilization of system resources and improving system performance. In the prior art, the quantity and locations of GP symbols, and the quantity of uplink symbols are statically configured. Compared with the prior art, in this embodiment of this application, the quantity of available downlink symbols of the near-end terminal device is increased, thereby increasing available resources of a downlink PDSCH and facilitating improvement of the system performance.

In the foregoing embodiment, for GP configuration, in addition to the coverage distance, interference from a neighboring access network device or a remote access network device also needs to be considered. A signal of the neighboring access network device or the remote access network device needs to be within a guard range of the GP, so that a downlink signal of the neighboring access network device or the remote access network device does not interfere with an uplink signal of the access network device.

In addition, when clock synchronization of the neighboring access network device or the remote access network device is faulty or unavailable, a synchronization loss of the access network device is caused, and clock deviation from a peripheral access network device occurs. If transmitting and receiving moments of access network devices are not aligned, and a time point at which the downlink signal from the neighboring access network device or the remote access network device reaches a terminal device (user equipment, UE) side exceeds a GP range, uplink receiving of the terminal device is interfered with; and consequently, the system performance is affected.

Under a low-altitude atmospheric duct effect, when the remote access network device reaches a specific height, a high-power downlink signal of the remote access network device can implement long-distance transmission to reach a near-end access network device. Because a long-distance transmission time exceeds an uplink-downlink guard period, the downlink signal of the remote access network device is received by the near-end access network device in a receiving slot of the near-end access network device, which interferes with uplink signal receiving of the near-end access network device; and consequently, interference is caused and the system performance is affected.

In consideration of a scenario in which there is interference between access network devices, a cause of the interference may be a timing deviation between the access network devices, or propagation interference from the remote access network device. All the access network devices may continuously monitor an interference level on receiving symbols. If interference between the access network devices is found, channel configuration and GP configuration are adjusted to avoid the interference.

This application provides a solution, to configure different GP lengths for different terminal devices. For example, different GP lengths may be configured for different terminal devices based on an interference detection condition. According to the solution in this application, uplink and downlink resources can be flexibly scheduled, interference can be effectively avoided, available air interface resources can be maximized, and a system capacity and user experience can be improved.

Figure 11:
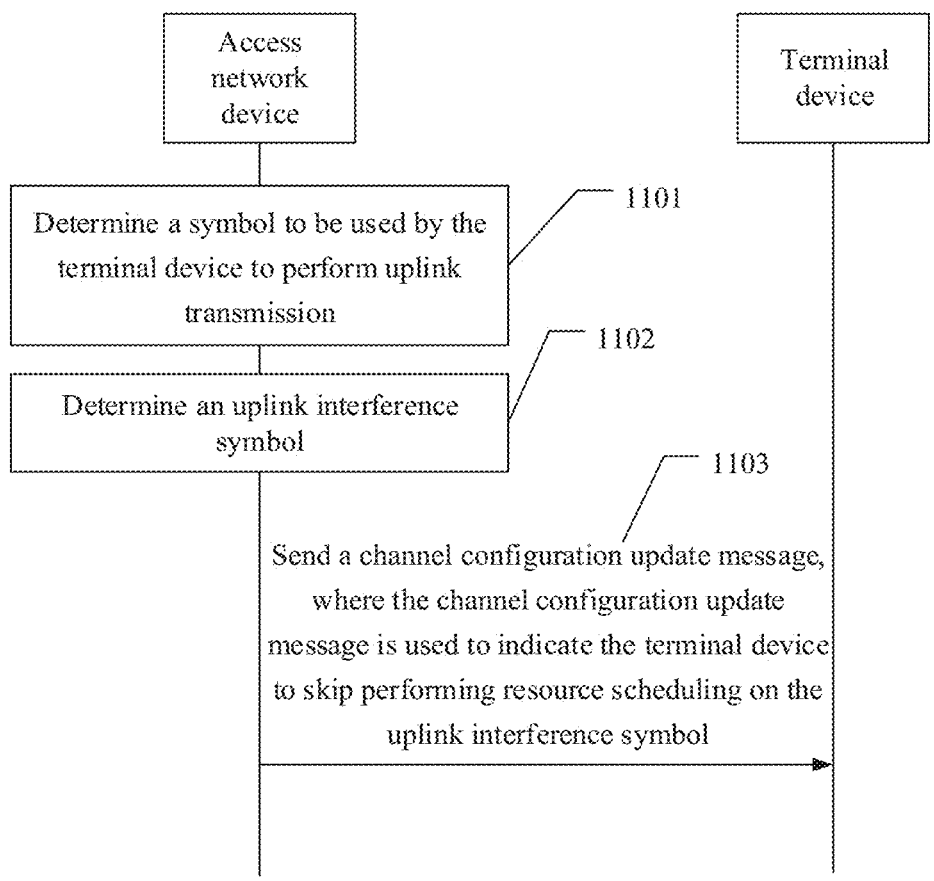
FIG. 11 is a schematic diagram of an embodiment of an interference coordination method for uplink and downlink resources according to an embodiment of this application.

The following further describes the technical solution in this application in a form of an embodiment. FIG. 11 is a schematic diagram of an embodiment of an interference coordination method for uplink and downlink resources according to an embodiment of this application. The method in FIG. 11 may be combined with the time domain resource allocation solution provided in the foregoing embodiments of this application (for example, the solutions in FIG. 5A-1 and FIG. 5A-2 to FIG. 10) or may be performed separately, and may include the following steps.

1101. An access network device determines a symbol to be used by a terminal device to perform uplink transmission.

Herein, the symbol to be used for uplink transmission may be an uplink transmission symbol other than the GP resource required by the terminal device in the GP resource required by the cell in the time domain resource allocation solution provided in the foregoing embodiments of this application, or an uplink transmission symbol other than the GP resource required by the cell.

Herein, the uplink transmission symbol may be configured by using cell-level semi-static configuration information, user-level semi-static configuration information, or user-level dynamic configuration information.

1102. The access network device determines an uplink interference symbol.

Figure 12A:
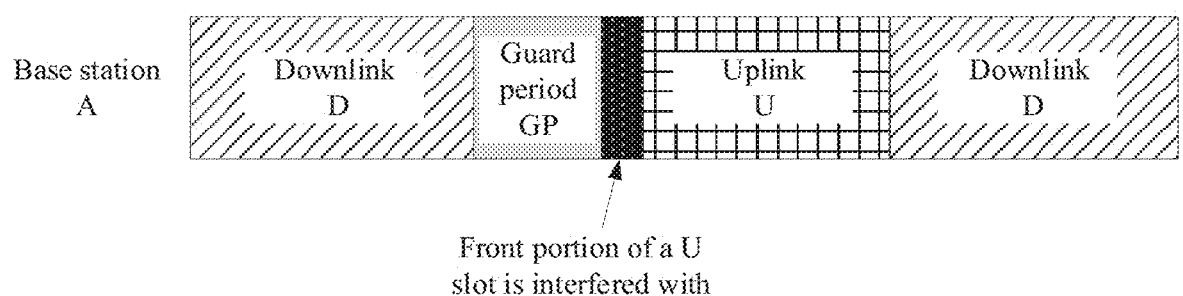
FIG. 12A is a schematic diagram of an uplink interference symbol according to an embodiment of this application.
Figure 12B:
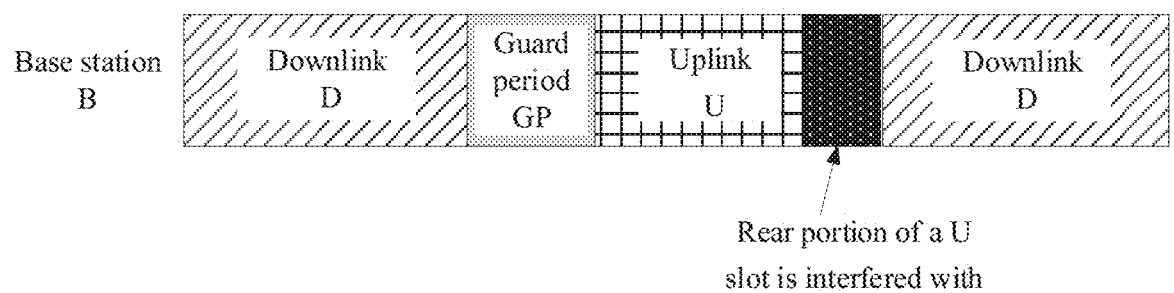
FIG. 12B is a schematic diagram of an uplink interference symbol according to an embodiment of this application.

The access network device determines the uplink interference symbol from uplink transmission symbols based on an IoT measurement result of the uplink transmission symbols. For example, FIG. 12A is a schematic diagram of an uplink interference symbol according to an embodiment of this application. As shown in FIG. 12A, a typical 5G scenario with a subcarrier of 30 kHz is used as an example, and a shaded part represents the uplink interference symbol. In other words, interference is mainly concentrated in one or two symbols in a front portion of a U slot. FIG. 12B is a schematic diagram of an uplink interference symbol according to an embodiment of this application. As shown in FIG. 12B, a typical 5G scenario with a subcarrier of 30 kHz is used as an example, and a shaded part represents the uplink interference symbol. In other words, interference is mainly concentrated in one to four symbols in a rear portion of a U slot.

1103. The access network device sends a channel configuration update message to the terminal device, where the channel configuration update message is used to indicate the terminal device to skip performing resource scheduling on the uplink interference symbol.

After determining a quantity of uplink interference symbols, the access network device sends the channel configuration update message to the terminal, and the channel configuration update message is used to indicate the terminal device to skip performing resource scheduling on the uplink interference symbol. The terminal device performs the resource scheduling on an uplink transmission symbol other than the uplink interference symbol.

It may be understood that, there may be a channel SRS/PUSCH/PUCCH on these uplink transmission symbols, and the access network device may indicate the terminal device to adjust channel configuration of the SRS/PUSCH/PUCCH through UE-level RRC signaling or DCI signaling, to bypass the uplink interference symbol.

In the prior art, an access network device cannot flexibly bypass an interference symbol based on an interference condition, and consequently, a system service is severely damaged once interference occurs. In this embodiment of this application, after determining the uplink interference symbol, the access network device may send the channel configuration update message to the terminal device, and the channel configuration update message is used to indicate the terminal device to skip performing resource scheduling on the uplink interference symbol. Although system capacity is slightly compromised, a system service can be normally provided.

Figure 13:
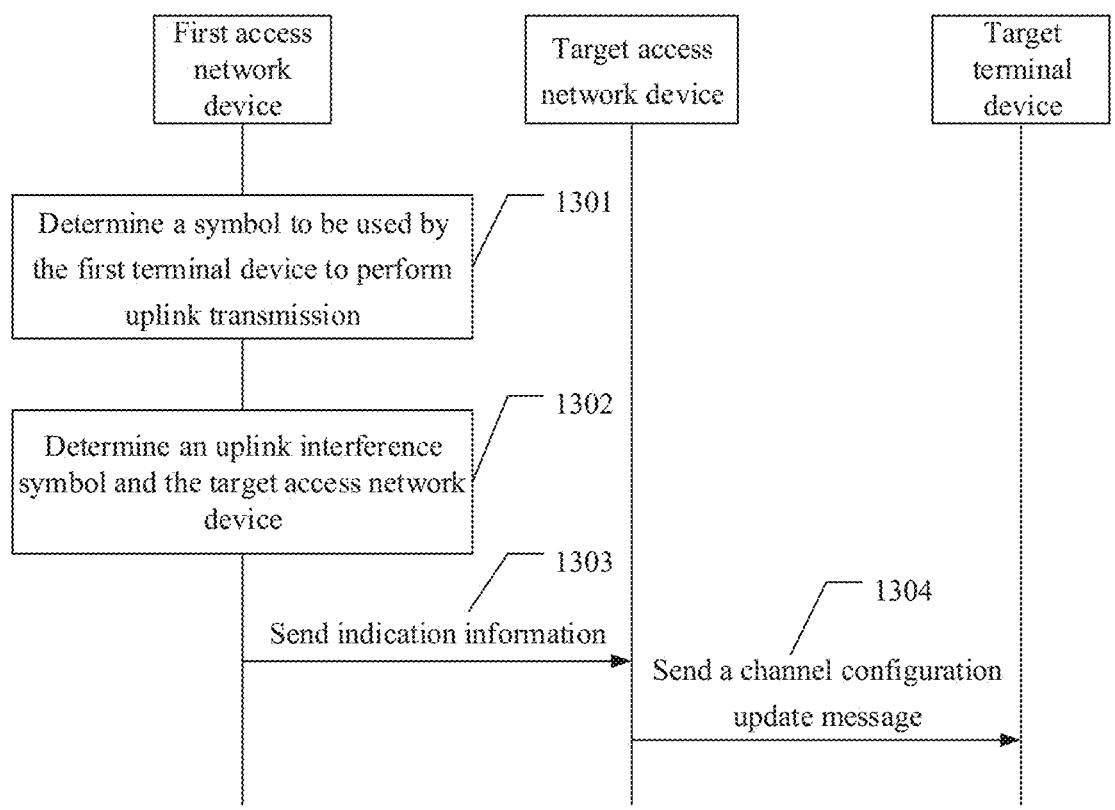
FIG. 13 is a schematic diagram of another embodiment of an interference coordination method for uplink and downlink resources according to an embodiment of this application.

FIG. 13 is a schematic diagram of an embodiment of an interference coordination method for uplink and downlink resources according to an embodiment of this application. The method may include the following steps.

1301. A first access network device determines a symbol to be used by a first terminal device to perform uplink transmission.

Herein, the symbol to be used for uplink transmission may be an uplink transmission symbol other than the GP resource required by the terminal device in the GP resource required by the cell in the time domain resource allocation solution provided in the foregoing embodiments of this application, or an uplink transmission symbol other than the GP resource required by the cell.

Herein, the uplink transmission symbol may be configured by using cell-level semi-static configuration information, user-level semi-static configuration information, or user-level dynamic configuration information.

1302. The first access network device determines an uplink interference symbol and a target access network device, where the target access network device is an access network device that causes interference to the uplink transmission symbol.

A first base station determines the uplink interference symbol from uplink transmission symbols based on an IoT measurement result of the uplink transmission symbols. Each base station periodically sends a feature sequence. The first base station receives a periodic feature sequence sent by another base station, and then determines a target base station based on the periodic feature sequence. A downlink symbol determined by the target base station causes interference to an uplink symbol of the base station.

1303. The first access network device sends indication information to the target access network device.

The first base station sends indication information to the target base station, and the indication information is used to indicate the target base station to skip performing resource scheduling on a downlink symbol (downlink interference symbol) that causes interference to the uplink symbol of the first base station.

Figure 14A:
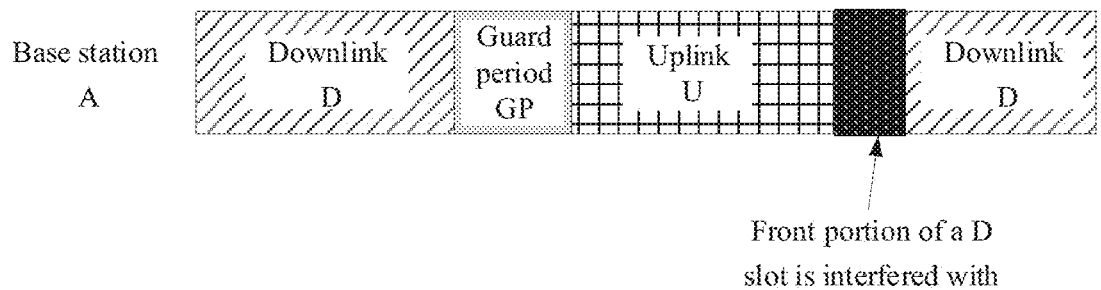
FIG. 14A is a schematic diagram of an uplink interference symbol according to an embodiment of this application.

For example, FIG. 14A is a schematic diagram of an uplink interference symbol according to an embodiment of this application. As shown in FIG. 14A, a typical 5G scenario with a subcarrier of 30 kHz is used as an example, and a shaded part represents the uplink interference symbol. In other words, interference is mainly concentrated in one to four symbols in a front portion of a D slot. In this case, the first base station expects the target base station to bypass several downlink symbols in a rear portion of a transmission slot.

Figure 14B:
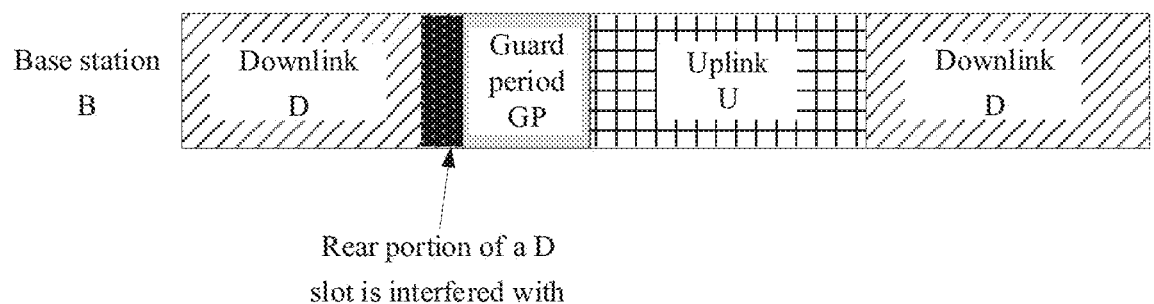
FIG. 14B is a schematic diagram of an uplink interference symbol according to an embodiment of this application.

FIG. 14B is a schematic diagram of an uplink interference symbol according to an embodiment of this application. As shown in FIG. 14B, a typical 5G scenario with a subcarrier of 30 kHz is used as an example, and a shaded part represents the uplink interference symbol. In other words, interference is mainly concentrated in one or two symbols in a rear portion of a D slot. In this case, the first base station expects the target base station to bypass several downlink symbols in a front portion of the transmission slot.

1304. The target access network device sends a channel configuration update message to the target terminal device, where the channel configuration update message is used to indicate the terminal device to skip performing resource scheduling on the downlink interference symbol.

The target base station determines a downlink interference symbol based on the indication information, and then sends the channel configuration update message to the target terminal device, and the channel configuration update message is used to indicate the terminal device to skip performing resource scheduling on the downlink interference symbol. The target terminal device is a terminal device within coverage of the target base station.

When the target terminal device skips performing resource scheduling on the downlink interference symbol, for the base station, any uplink transmission symbol can be used to perform resource scheduling, and there is no uplink interference symbol.

There may be a channel PDSCH/PUCCH on the downlink transmission symbol of the target base station. The target base station changes related channel configuration and indicates, through UE-level RRC signaling or DCI signaling, target UE to bypass the interference symbol.

In the prior art, a base station cannot flexibly bypass an interference symbol based on an interference condition; and consequently, a system service is severely damaged once interference occurs. In this embodiment of this application, the base station determines the uplink interference symbol, and may further determine a corresponding target base station that causes the uplink interference symbol, and send indication information to the target base station. After receiving the indication information, the target base station may send the channel configuration update message to the target terminal device. The channel configuration update message is used to indicate the target terminal device to skip performing resource scheduling on the downlink interference symbol that causes interference to the base station. For the base station, system capacity is not compromised, and a system service can be normally provided. For the target base station, although system capacity is slightly compromised, a system service can be normally provided.

It should be noted that the interference coordination methods in FIG. 11 to FIG. 14B (including FIG. 11, FIG. 12A, FIG. 12B, FIG. 13, FIG. 14A, and FIG. 14B) are also applicable to a downlink time domain resource. After being interfered with on a downlink time domain resource, the base station may choose to skip performing scheduling on the downlink time domain resource, or send the interfered downlink time domain resource to an interfering base station, so that the interfering base station skips performing uplink scheduling.

Figure 15:
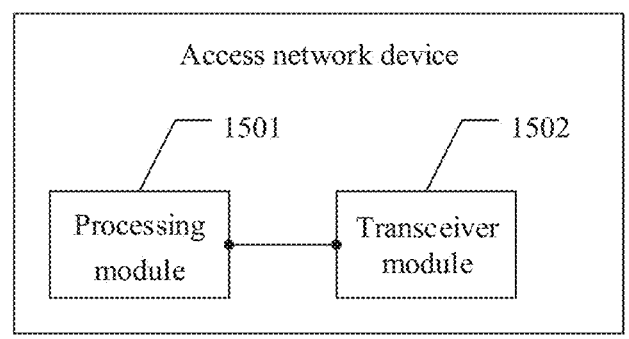
FIG. 15 is a schematic diagram of an embodiment of an access network device according to an embodiment of this application.

FIG. 15 is a schematic diagram of an embodiment of an access network device according to an embodiment of this application. The access network device may include:
- a processing module 1501, configured to determine a guard period GP resource required by a terminal device, where the GP resource required by the terminal device is a GP resource required by the terminal device for uplink synchronization with the access network device; and
- a transceiver module 1502, configured to send first time domain resource configuration information to the terminal device, where the first time domain resource configuration information indicates the GP resource required by the terminal device.

Optionally, in some embodiments of this application, the processing module 1501 is specifically configured to: determine an uplink timing advance TA measurement value of the terminal device; determine a GP length based on the uplink TA measurement value of the terminal device; and determine the GP resource based on the GP length.

Optionally, in some embodiments of this application,
the processing module 1501 is further configured to determine a GP resource required by a cell in which the terminal device is located, where the GP resource required by the cell is a GP resource required by a remote terminal device for uplink synchronization with the access network device; and the first time domain resource configuration information indicates the GP resource required by the cell, and the GP resource required by the cell includes the GP resource required by the terminal device.

Optionally, in some embodiments of this application,
the processing module 1501 is specifically configured to: determine a first GP length based on a maximum coverage distance of the cell; and determine, based on the first GP length, the GP resource required by the cell in which the terminal device is located; or
the processing module 1501 is specifically configured to: determine a second GP length based on uplink-downlink subframe configuration of the cell, and determine, based on the second GP length, the GP resource required by the cell in which the terminal device is located; or
the processing module 1501 is specifically configured to: determine a first GP length based on a maximum coverage distance of the cell; determine a second GP length based on uplink-downlink subframe configuration of the cell; and determine, based on a larger one of the first GP length and the second GP length, the GP resource required by the cell in which the terminal device is located.

Optionally, in some embodiments of this application,
the transceiver module 1502 is further configured to: send second time domain resource configuration information to the terminal device, where the second time domain resource configuration information is used to indicate that an available time domain resource is a downlink time domain resource; and the available time domain resource is some or all resources other than the GP resource required by the terminal device in the GP resource required by the cell in which the terminal device is located.

Optionally, in some embodiments of this application,
the transceiver module 1502 is further configured to: send second time domain resource configuration information to the terminal device, where the second time domain resource configuration information is used to indicate that an available time domain resource is an uplink time domain resource; and the available time domain resource is some or all resources other than the GP resource required by the terminal device in the GP resource required by the cell in which the terminal device is located.

Optionally, in some embodiments of this application,
the processing module 1501 is further configured to perform interference measurement on the available time domain resource; and
the transceiver module 1502 is specifically configured to: when the available time domain resource is not interfered with or an interference measurement value is less than a threshold, send the second time domain resource configuration information to the terminal device.

Optionally, in some embodiments of this application,
the transceiver module 1502 is further configured to send indication information to the terminal device, where the indication information is used to indicate the terminal device to send an uplink signal on the uplink time domain resource; and
the processing module 1501 is further configured to: perform interference measurement on the uplink time domain resource by using the uplink signal; and when an interference measurement value of the uplink time domain resource is greater than a threshold, skip performing uplink scheduling on the uplink time domain resource.

Optionally, in some embodiments of this application, the processing module 1501 is further configured to determine a GP resource required by a cell, where the GP resource required by the cell is a GP resource required by a remote terminal device for uplink synchronization with the access network device.

Optionally, in some embodiments of this application, the transceiver module 1502 is further configured to send indication information to the terminal device, where the indication information is used to indicate the terminal device to send an uplink signal on the available time domain resource; and the processing module 1501 is further configured to: perform uplink interference measurement on the available time domain resource by using the uplink signal, where the available time domain resource is some or all resources other than the GP resource required by the terminal device in the GP resource required by the cell in which the terminal device is located; and when the available time domain resource is interfered with or an interference measurement value is greater than a threshold, the first time domain resource configuration information is further used to indicate that the available time domain resource is the GP resource.

Optionally, in some embodiments of this application, the transceiver module 1502 is further configured to: send third time domain resource configuration information to the terminal device, where the third time domain resource configuration information is used to indicate that an available time domain resource is an uplink time domain resource or a downlink time domain resource; and the available time domain resource is some or all resources other than the GP resource required by the terminal device in the GP resource required by the cell in which the terminal device is located.

Optionally, in some embodiments of this application, when the third time domain resource configuration information is used to indicate that an available time domain resource is an uplink time domain resource, the transceiver module 1502 is further configured to send indication information to the terminal device, where the indication information is used to indicate the terminal device to send an uplink signal on the uplink time domain resource; and the processing module 1501 is further configured to: perform interference measurement on the uplink time domain resource by using the uplink signal; and when the uplink time domain resource is interfered with and an interference measurement value is greater than a threshold, skip performing uplink scheduling on the uplink time domain resource.

Figure 16:
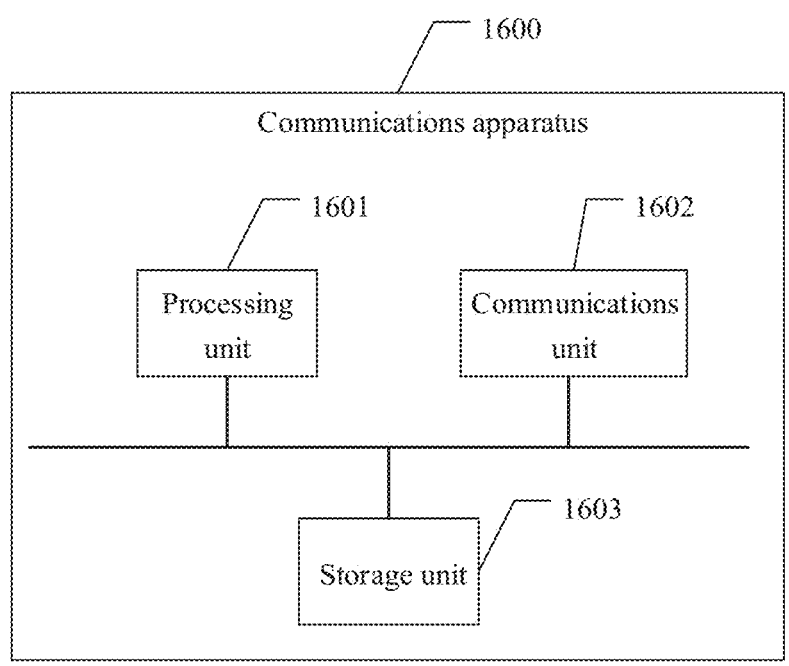
FIG. 16 is a schematic diagram of an embodiment of a communications apparatus according to an embodiment of this application.

The following describes a communications apparatus 1600 provided in an embodiment of this application. It is shown in FIG. 16.

The communications apparatus 1600 includes a processing unit 1601 and a communications unit 1602. Optionally, the communications apparatus 1600 further includes a storage unit 1603. The processing unit 1601, the communications unit 1602, and the storage unit 1603 are connected through a communications bus.

The communications unit 1602 may be an apparatus with a transceiver function for communicating with another network device or a communication network.

The storage unit 1603 may include one or more memories, and the memories may be components for storing programs or data in one or more devices or circuits.

The storage unit 1603 may exist independently, or is connected to the processing unit 1601 through the communications bus. The storage unit 1603 may be alternatively integrated with the processing unit 1601.

The communications apparatus 1600 may be used in a communications device, a circuit, a hardware component, or a chip.

The communications apparatus 1600 may be the access network device in the embodiments of this application, for example, the access network device 101. FIG. 1 is a schematic diagram of the access network device. Optionally, the communications unit 1602 of the communications apparatus 1600 may include an antenna and a transceiver of the access network device. The communications unit 1602 may further include a network interface of the access network device.

The communications apparatus 1600 may be a chip in the access network device in the embodiments of this application, for example, a chip in the access network device 101. The communications unit 1602 may be an input/output interface, a pin, a circuit, or the like. Optionally, the storage unit may store computer-executable instructions of a method on an access network device side, so that the processing unit 1601 performs the method on the access network device side in the foregoing embodiments. The storage unit 1602 may be a register, a cache, a RAM, or the like. The storage unit 1603 may be integrated with the processing unit 1601; the storage unit 1602 may be a ROM or another type of static storage device that can store static information and instructions. The storage unit 1602 may be independent of the processing unit 1601. Optionally, with development of a wireless communications technology, the transceiver may be integrated into the communications apparatus 1600. For example, a transceiver and a network interface are integrated into the communications unit 1602.

When the communications apparatus 1600 is the access network device or the chip in the access network device in the embodiments of this application, the method executed by the access network device 101 in the foregoing embodiments may be implemented. The communications unit 1602 may send time domain resource configuration information to the terminal device 102, for example, one or more of cell-level semi-static configuration information, user-level semi-static configuration information, and user-level dynamic configuration information.

In this embodiment of this application, the processing unit 1601 is configured to determine a guard period GP resource required by a terminal device, where the GP resource required by the terminal device is a GP resource required by the terminal device for uplink synchronization with the access network device.

The communications unit 1602 is configured to send first time domain resource configuration information to the terminal device, where the first time domain resource configuration information indicates the GP resource required by the terminal device.

Optionally, in some embodiments of this application, the processing unit 1601 is specifically configured to: determine an uplink timing advance TA measurement value of the terminal device; determine a GP length based on the uplink TA measurement value of the terminal device; and determine the GP resource based on the GP length.

Optionally, in some embodiments of this application,
the processing unit 1601 is further configured to determine a GP resource required by a cell in which the terminal device is located, where the GP resource required by the cell is a GP resource required by a remote terminal device for uplink synchronization with the access network device; and the first time domain resource configuration information indicates the GP resource required by the cell, and the GP resource required by the cell includes the GP resource required by the terminal device.

Optionally, in some embodiments of this application,
the processing unit 1601 is specifically configured to: determine a first GP length based on a maximum coverage distance of the cell; and determine, based on the first GP length, the GP resource required by the cell in which the terminal device is located; or the processing unit 160) is specifically configured to: determine a second GP length based on uplink-downlink subframe configuration of the cell; and determine, based on the second GP length, the GP resource required by the cell in which the terminal device is located; or the processing unit 1601 is specifically configured to: determine a first GP length based on a maximum coverage distance of the cell; determine a second GP length based on uplink-downlink subframe configuration of the cell; and determine, based on a larger one of the first GP length and the second GP length, the GP resource required by the cell in which the terminal device is located.

Optionally, in some embodiments of this application,
the communications unit 1602 is further configured to: send second time domain resource configuration information to the terminal device, where the second time domain resource configuration information is used to indicate that an available time domain resource is a downlink time domain resource; and the available time domain resource is some or all resources other than the GP resource required by the terminal device in the GP resource required by the cell in which the terminal device is located.

Optionally, in some embodiments of this application,
the communications unit 1602 is further configured to: send second time domain resource configuration information to the terminal device, where the second time domain resource configuration information is used to indicate that an available time domain resource is an uplink time domain resource; and the available time domain resource is some or all resources other than the GP resource required by the terminal device in the GP resource required by the cell in which the terminal device is located.

Optionally, in some embodiments of this application,
the processing unit 1601 is further configured to perform interference measurement on the available time domain resource; and
the communications unit 1602 is specifically configured to: when the available time domain resource is not interfered with or an interference measurement value is less than a threshold, send the second time domain resource configuration information to the terminal device.

Optionally, in some embodiments of this application,
the communications unit 1602 is further configured to send indication information to the terminal device, where the indication information is used to indicate the terminal device to send an uplink signal on the uplink time domain resource; and the processing unit 1601 is further configured to: perform interference measurement on the uplink time domain resource by using the uplink signal; and when an interference measurement value of the uplink time domain resource is greater than a threshold, skip performing uplink scheduling on the uplink time domain resource.

Optionally, in some embodiments of this application,
the processing unit 1601 is further configured to determine a GP resource required by a cell, where the GP resource required by the cell is a GP resource required by a remote terminal device for uplink synchronization with the access network device.

Optionally, in some embodiments of this application,
the communications unit 1602 is further configured to send indication information to the terminal device, where the indication information is used to indicate the terminal device to send an uplink signal on the available time domain resource; and the processing unit 1601 is further configured to: perform uplink interference measurement on the available time domain resource by using the uplink signal, where the available time domain resource is some or all resources other than the GP resource required by the terminal device in the GP resource required by the cell in which the terminal device is located; and when the available time domain resource is interfered with or an interference measurement value is greater than a threshold, the first time domain resource configuration information is further used to indicate that the available time domain resource is the GP resource.

Optionally, in some embodiments of this application,
the communications unit 1602 is further configured to: send third time domain resource configuration information to the terminal device, where the third time domain resource configuration information is used to indicate that an available time domain resource is an uplink time domain resource or a downlink time domain resource; and the available time domain resource is some or all resources other than the GP resource required by the terminal device in the GP resource required by the cell in which the terminal device is located.

Optionally, in some embodiments of this application,
when the third time domain resource configuration information is used to indicate that an available time domain resource is an uplink time domain resource,
the communications unit 1602 is further configured to send indication information to the terminal device, where the indication information is used to indicate the terminal device to send an uplink signal on the uplink time domain resource; and the processing unit 1601 is further configured to: perform interference measurement on the uplink time domain resource by using the uplink signal; and when the uplink time domain resource is interfered with and an interference measurement value is greater than a threshold, skip performing uplink scheduling on the uplink time domain resource.

An embodiment of this application further provides the following method. The method may be combined with related content of FIG. 5A-1 and FIG. 5A-2 to FIG. 8 (including FIG. 5A-1, FIG. 5A-2, FIG. 5B, FIG. 6, FIG. 7, and FIG. 8). The method may be performed by an access network device or a chip in the access network device. The method includes the following steps.

M01. Determine a channel measurement result of a terminal device.

Optionally, the channel measurement result includes a delay measurement result.

Optionally, the delay measurement result may be an uplink delay measurement result and/or a downlink delay measurement result, and the uplink delay measurement result may be an uplink TA measurement value.

Optionally, the channel measurement result further includes an interference measurement result and/or a channel quality measurement result.

Optionally, the interference measurement result may include an uplink interference measurement result and/or a downlink interference measurement result, and the uplink interference measurement result may include an uplink IoT measurement result.

Optionally, the channel quality measurement result may include an uplink channel measurement result and/or a downlink channel measurement result.

M02. Determine, based on the channel measurement result, a guard period GP resource required by the terminal device during uplink-downlink handover.

For example, reference may be made to S503 and S5B07. For example, the resources of the minimum quantity of GP symbols required by the terminal device 102 in S503 are included. Optionally, the resources corresponding to the newly added uplink symbols that are not interfered with in S5B07 may further be included. Optionally, the GP resource may be the GP resource in S6B04.

Optionally, a length of the guard period GP resource required by the terminal device is greater than that of a one-way delay, and the one-way delay may be the uplink TA measurement value.

Optionally, a length of the guard period GP resource required by the terminal device is greater than a length of a round trip delay, and the length of the round trip delay may be twice the uplink TA measurement value.

Optionally, a length of the guard period GP resource required by the terminal device is greater than (length of a round trip delay+uplink-downlink handover time of the terminal device+uplink-downlink handover time of the access network device), and the length of the round trip delay may be twice the uplink TA measurement value.

M03. Send time domain resource configuration information to the terminal device, where the time domain resource configuration information indicates that the GP resource required by the terminal device is an unknown time domain resource.

Optionally, the time domain resource configuration information may be one or more of cell-level semi-static configuration information, user-level semi-static configuration information, and user-level dynamic configuration information.

Optionally, the time domain resource configuration information may be sent to the terminal device for a plurality of times.

Optionally, in the time domain resource configuration information, a resource other than the GP resource required by the terminal may be configured as an uplink time domain resource or a downlink time domain resource.

Optionally, an unknown time domain resource may be understood as a flexible time domain resource.

M04. Determine, based on one or more of a maximum coverage requirement of a cell in which the terminal device is located and uplink-downlink subframe configuration of the cell, a GP resource required by the cell, where the GP resource required by the cell includes the GP resource required by the terminal device.

M04 is optional.

Optionally, in M02, a first GP resource may be determined based on the delay measurement result, and the GP resource required by the terminal device includes the first GP resource.

For example, reference may be made to S503.

The following separately describes the method from the perspectives of uplink and downlink.

Uplink:

In a first implementation, the method further includes the following steps.

M05. Send indication information to a terminal device, where the indication information is used to indicate the terminal device to send an uplink signal on a second GP resource, and the second GP resource is some or all time domain resources other than the first GP resource in the GP resource required by the cell.

M06. Determine the interference measurement result by measuring the uplink signal.

M02 may specifically include:

when the interference measurement result indicates that the second GP resource is interfered with or an interference value is greater than a threshold, the GP resource required by the terminal device further includes the second GP resource.

Optionally, when the interference measurement result indicates that the second GP resource is not interfered with or an interference value is less than a threshold, the time domain resource configuration information indicates that the second GP resource is an uplink time domain resource.

For example, for the first implementation, reference may be made to related content in S5B05 to S5B07 and S6B03 to S6B04.

In a second implementation, the time domain resource configuration information is further used to indicate that a second GP resource is an uplink time domain resource, and the second GP resource is some or all time domain resources other than the first GP resource in the GP resource required by the cell.

For example, for the second implementation, reference may be made to related content in S5A05 and S6A03.

In the first implementation and the second implementation, when the time domain resource configuration information indicates that the second GP resource is an uplink time domain resource, the method further includes: sending indication information to the terminal, where the indication information is used to indicate the terminal device to send an uplink signal on the uplink time domain resource.

Optionally, the uplink signal includes a sounding reference signal SRS.

Downlink:

In a first implementation, the method further includes the following steps.

M05. Send a downlink signal on a second GP resource, where the second GP resource is some or all time domain resources other than the first GP resource in the GP resource required by the cell.

M06. Receive a channel quality measurement result from the terminal device, where the channel quality measurement result is obtained by measuring the downlink signal.

M02 may include: when the channel quality measurement result indicates that a channel quality value on the second GP resource is less than a threshold, the GP resource required by the terminal device further includes the second GP resource; or when the channel quality measurement result indicates that a channel quality value on the second GP resource is greater than a threshold, the time domain resource configuration information indicates that the second GP resource is a downlink time domain resource.

In a second implementation, the time domain resource configuration information is further used to indicate that a second GP resource is a downlink time domain resource, and the second GP resource is some or all time domain resources other than the first GP resource in the GP resource required by the cell.

For example, for the second implementation, reference may be made to related content in S5C05 or S6A03.

Optionally, in the first implementation and the second implementation, when the time domain resource configuration information indicates that the second GP resource is a downlink time domain resource, the method further includes: sending indication information to the terminal, where the indication information is used to indicate the terminal device to receive a downlink signal on the downlink time domain resource.

Optionally, the downlink signal includes a physical downlink shared channel (physical downlink shared channel, PDSCH) signal.

The method may be implemented by the apparatus in FIG. 15 and FIG. 16. For details, reference may be made to the related content of FIG. 15 and FIG. 16. Details are not described herein again.

For example, for each step of the foregoing method performed by the access network device, the access network device has a unit or a module that performs each step of the method; and for each step in the method performed by the terminal, the terminal has a unit or a module that performs each step of the method.

This application further provides a communications apparatus. The communications apparatus may include a processor, the processor is coupled to a memory, and the processor may execute a program in the memory to implement the foregoing method. The communications apparatus may be the access network device or a chip in the access network device.

This application further provides a computer-readable storage medium. The computer-readable storage medium is configured to store an instruction. When the instruction is run, the foregoing method may be implemented.

This application further provides a computer program product. The computer program product includes an instruction. When the computer program product runs on a computer, the foregoing method may be implemented.

In this application, "at least one" means one or more. "Plurality" refers to two or more than two. "And/or" describes an association relationship between associated objects, and indicates that three relationships may exist. For example, A and/or B may indicate the following cases: A exists alone, both A and B exist, and B exists alone, where A and B may be singular or plural. The character "/" generally indicates an "or" relationship between the associated objects.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedures or functions according to the embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

It may be clearly understood by a person skilled in the art that, for the purpose of convenient and brief description, for a detailed working process of the foregoing system, apparatus, and unit, reference may be made to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate. Parts displayed as units may or may not be physical units, to be specific, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) to perform all or some of the steps of the methods described in the embodiments of this application. The storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A time domain resource configuration method for an access network device, wherein the method comprises:
   determining a channel measurement result of a terminal device;
   determining, based on the channel measurement result, a guard period (GP) resource required by the terminal device during uplink-downlink handover, wherein the GP resource required by the terminal device comprises a first GP resource;
   sending time domain resource configuration information to the terminal device, wherein the time domain resource configuration information indicates the GP resource; and
   sending indication information to the terminal device, wherein the indication information is used to indicate the terminal device to send an uplink signal based on a second GP resource, and wherein the second GP resource is some or all time domain resources other than the first GP resource in a GP resource required by a cell.

2. The method according to claim 1, wherein the GP resource required by the terminal device is used to ensure uplink synchronization between the terminal device and the access network device.

3. The method according to claim 1, wherein the channel measurement result comprises a delay measurement result.

4. The method according to claim 3, wherein determining, based on the channel measurement result, the GP resource required by the terminal device during the uplink-downlink handover comprises:
   determining an uplink timing advance (TA) measurement value of the terminal device; and
   determining the GP resource required by the terminal device based on the uplink TA measurement value of the terminal device.

5. The method according to claim 1, wherein the GP resource required by the terminal device is a subset of the GP resource required by the cell, and wherein the method further comprises:
   determining, based on one or more of a maximum coverage requirement of the cell in which the terminal device is located and uplink-downlink subframe configuration of the cell, the GP resource required by the cell.

6. The method according to claim 5, wherein the time domain resource configuration information further indicates that some or all resources other than the GP resource required by the terminal device in the GP resource required by the cell are downlink time domain resources or uplink time domain resources.

7. The method according to claim 6, wherein the method further comprises:
   determining an interference measurement result by measuring the uplink signal, wherein:
      when the interference measurement result indicates that the second GP resource is interfered with or an interference value is greater than a threshold, the GP resource required by the terminal device further comprises the second GP resource; or
      when the interference measurement result indicates that the second GP resource is not interfered with or an interference value is less than a threshold, the time domain resource configuration information indicates that the second GP resource is an uplink time domain resource.

8. The method according to claim 7, wherein the uplink time domain resource is used to receive a sounding reference signal (SRS).

9. The method according to claim 6, wherein the method further comprises:
   sending a downlink signal based on the second GP resource; and
   receiving a channel quality measurement result from the terminal device, wherein the channel quality measurement result is obtained by measuring the downlink signal, wherein:
      when the channel quality measurement result indicates that a channel quality value on the second GP resource is less than a threshold, the GP resource required by the terminal device further comprises the second GP resource; or
      when the channel quality measurement result indicates that a channel quality value on the second GP resource is greater than a threshold, the time domain resource configuration information indicates that the second GP resource is a downlink time domain resource.

10. The method according to claim 9, wherein the downlink time domain resource is a resource for a physical downlink shared channel (PDSCH).

11. An apparatus for an access network device, comprising at least one processor and a memory coupled to the at least one processor and storing programming instructions for execution by the at least one processor, wherein the programming instructions instruct the access network device to perform operations comprising:
   determining a channel measurement result of a terminal device;
   determining, based on the channel measurement result, a guard period (GP) resource required by the terminal device during uplink-downlink handover, wherein the GP resource required by the terminal device comprises a first GP resource;
   sending time domain resource configuration information to the terminal device, wherein the time domain resource configuration information indicates the GP resource; and
   sending indication information to the terminal device, wherein the indication information is used to indicate the terminal device to send an uplink signal based on a second GP resource, and wherein the second GP resource is some or all time domain resources other than the first GP resource in a GP resource required by a cell.

12. The apparatus according to claim 11, wherein the GP resource required by the terminal device is used to ensure uplink synchronization between the terminal device and the access network device.

13. The apparatus according to claim 11, wherein the channel measurement result comprises a delay measurement result.

14. The apparatus according to claim 13, wherein determining, based on the channel measurement result, the GP resource required by the terminal device during the uplink-downlink handover comprises:
  determining an uplink timing advance (TA) measurement value of the terminal device; and
  determining the GP resource required by the terminal device based on the uplink TA measurement value of the terminal device.

15. The apparatus according to claim 11, wherein the GP resource required by the terminal device is a subset of the GP resource required by the cell, and wherein the operations further comprise:
  determining, based on one or more of a maximum coverage requirement of the cell in which the terminal device is located and uplink-downlink subframe configuration of the cell, the GP resource required by the cell.

16. The apparatus according to claim 15, wherein the time domain resource configuration information further indicates that some or all resources other than the GP resource required by the terminal device in the GP resource required by the cell are downlink time domain resources or uplink time domain resources.

17. The apparatus according to claim 16, wherein the operations further comprise:
  determining an an interference measurement result by measuring the uplink signal, wherein:
    when the interference measurement result indicates that the second GP resource is interfered with or an interference value is greater than a threshold, the GP resource required by the terminal device further comprises the second GP resource; or
    when the interference measurement result indicates that the second GP resource is not interfered with or an interference value is less than a threshold, the time domain resource configuration information indicates that the second GP resource is an uplink time domain resource.

18. The apparatus according to claim 17, wherein the uplink time domain resource is used to receive a sounding reference signal (SRS).

19. The apparatus according to claim 16, wherein the operations further comprise:
  sending a downlink signal based on the second GP resource; and
  receiving a channel quality measurement result from the terminal device, wherein the channel quality measurement result is obtained by measuring the downlink signal, wherein:
    when the channel quality measurement result indicates that a channel quality value on the second GP resource is less than a threshold, the GP resource required by the terminal device further comprises the second GP resource; or
    when the channel quality measurement result indicates that a channel quality value on the second GP resource is greater than a threshold, the time domain resource configuration information indicates that the second GP resource is a downlink time domain resource.

20. The apparatus according to claim 19, wherein the downlink time domain resource is a resource for a physical downlink shared channel (PDSCH).

* * * * *

UNITED STATES PATENT AND TRADEMARK OFFICE
CERTIFICATE OF CORRECTION

PATENT NO. : 11,902,840 B2
APPLICATION NO. : 17/197674
DATED : February 13, 2024
INVENTOR(S) : Fang Zhang, Chengyi Wang and Kai Xu It is certified that error appears in the above-identified patent and that said Letters Patent is hereby corrected as shown below:

On the Title Page

Column 2 (Abstract), Line 2, after "devices" insert therefore -- . --;

In the Claims

Column 43, Line 34, Claim 17, please delete "an an" and insert -- an --.

Signed and Sealed this
Seventh Day of May, 2024

Katherine Kelly Vidal
*Director of the United States Patent and Trademark Office*